(12) United States Patent
Mochizuki et al.

(10) Patent No.: US 10,189,982 B2
(45) Date of Patent: Jan. 29, 2019

(54) CONTACTING COMPONENT AND STRUCTURE CONTAINING SAID CONTACTING COMPONENT

(71) Applicant: TECHNO POLYMER CO., LTD., Tokyo (JP)

(72) Inventors: Isamu Mochizuki, Tokyo (JP); Kazuya Egawa, Tokyo (JP)

(73) Assignee: TECHNO POLYMER CO., LTD., Tokyo (JP)

( * ) Notice: Subject to any disclaimer, the term of this patent is extended or adjusted under 35 U.S.C. 154(b) by 30 days.

(21) Appl. No.: 15/447,554

(22) Filed: Mar. 2, 2017

(65) Prior Publication Data

US 2017/0198128 A1 Jul. 13, 2017

Related U.S. Application Data

(62) Division of application No. 14/782,970, filed as application No. PCT/JP2014/059938 on Apr. 4, 2014, now Pat. No. 9,708,482.

(30) Foreign Application Priority Data

Apr. 8, 2013 (JP) .................................. 2013-080245

(51) Int. Cl.
*C08L 25/16* (2006.01)
*C08L 51/00* (2006.01)
(Continued)

(52) U.S. Cl.
CPC .............. *C08L 25/16* (2013.01); *C08L 25/12* (2013.01); *C08L 51/003* (2013.01); *C08L 51/04* (2013.01);
(Continued)

(58) Field of Classification Search
CPC .............................. C08L 51/003; C08L 51/04
See application file for complete search history.

(56) References Cited

U.S. PATENT DOCUMENTS

| 4,761,463 A | 8/1988 | Matsumoto et al. |
| 2014/0206803 A1 | 7/2014 | Mochizuki et al. |

FOREIGN PATENT DOCUMENTS

| JP | 61-218651 A | 9/1986 |
| JP | 04-076042 A | 3/1992 |
| (Continued) | | |

OTHER PUBLICATIONS

PCT/JP2014/059938: International Search Report and Written Opinion dated Jul. 1, 2014.

*Primary Examiner* — Arrie L Reuther
(74) *Attorney, Agent, or Firm* — Kratz, Quintos & Hanson, LLP

(57) ABSTRACT

A contacting component and a structure including the contacting component are provided which are not only reduced in squeaking noises that are generated when comes into contact with and rubs against other members, but also superior in appearance of matting property.

The contacting component comprises a molded article made from a thermoplastic resin composition (X) containing a vinyl graft polymer (A), a vinyl non-graft polymer (B) and a matting agent (C), wherein the vinyl graft polymer (A) contains an ethylene-α-olefin rubber polymer (a1), and the structure comprises the contacting component.

15 Claims, 7 Drawing Sheets

(51) Int. Cl.
*C08L 51/04* (2006.01)
*C08L 69/00* (2006.01)
*C08L 25/12* (2006.01)
*C08L 51/06* (2006.01)

(52) U.S. Cl.
CPC ............... *C08L 51/06* (2013.01); *C08L 69/00* (2013.01); *C08L 2205/03* (2013.01); *C08L 2205/035* (2013.01)

(56) References Cited

FOREIGN PATENT DOCUMENTS

| | | | |
|---|---|---|---|
| JP | 2576863 | B2 | 1/1997 |
| JP | 2002-020574 | A | 1/2002 |
| JP | 2009-256551 | A | 11/2009 |
| JP | 2010-001377 | A | 1/2010 |
| JP | 2011-137066 | A | 7/2011 |
| JP | 2011137066 | A * | 7/2011 |
| JP | M11-174029 | A | 9/2011 |
| JP | 2013-112812 | A | 6/2013 |
| WO | 2013-031946 | A1 | 3/2013 |

* cited by examiner

FIG. 7
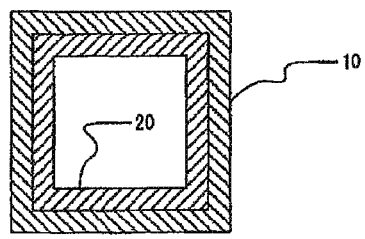
FIG. 8
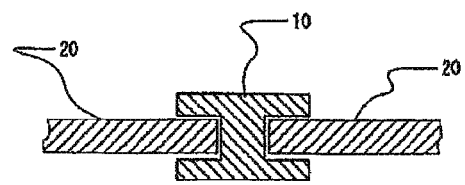
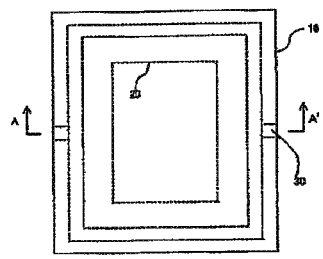 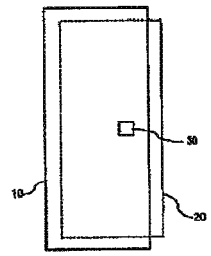
FIG. 9(A)      FIG. 9(B)
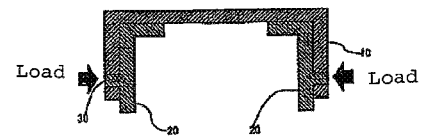
FIG. 9(C)

FIG. 10
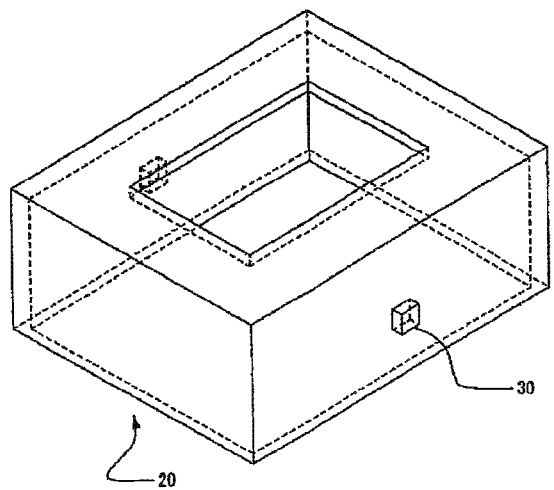
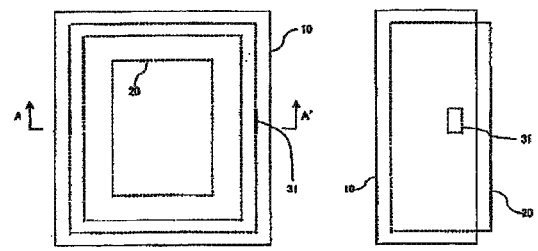
FIG. 11(A)　　　FIG. 11(B)
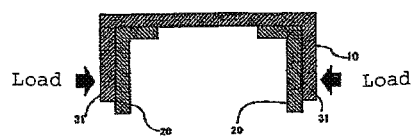
FIG. 11(C)

CONTACTING COMPONENT AND STRUCTURE CONTAINING SAID CONTACTING COMPONENT

CROSS REFERENCE TO RELATED APPLICATIONS

This application is a divisional of U.S. patent application Ser. No. 14/782,970, filed Oct. 7, 2015, which is a 371 application of International Application No. PCT/JP2014/059938, filed Apr. 4, 2014, which claims priority to Japanese Application No. 2013-080245, filed Apr. 8, 2013, which are hereby incorporated herein by reference in their entirety.

TECHNICAL FIELD

The present invention relates to a contacting component comprising a molded article which is remarkably reduced in squeaking noises caused by coming into contact with and rubbing against other members and which has appearance superior in matting property, and a structure containing the contacting component. More specifically, the present invention relates to a contacting component comprising a molded article which is capable of reducing squeaking noises even when placed under high temperatures for a long time, and of obtaining appearance superior in matting property, and a structure containing the contacting component.

BACKGROUND ART

ABS resins are widely used for the production of automobiles, household electrical appliances, OA equipments or the like due to its superior mechanical properties, heat resistance and moldability.

However, when components of the ABS resin or said component and other components of other materials are used to come into contact with and rub against each other, squeaking noises (rubbing noises) may be generated. For example, when the contacting component of the ABS resin is used as automobile interior components, with vibration during car driving, the interior components or the interior component and other members such as living sheet or foam made of a polyvinyl chloride, a chloroprene rubber, a polyurethane, a natural rubber, a polyester or a polyethylene come into contact with and rub against each other, squeaking noises (rubbing noises) may be generated. For example, in a ventilator made of the ABS resin is installed a valve shutter using a chloroprene rubber foam or the like as a sealing material in order to adjust an air quantity. If the valve shutter is rotated for air quantity adjustment, a case of the ventilator rubs against the sealing material as another member, so that squeaking noises may be generated. The squeaking noises is known as a noise risk caused by a stick slip phenomenon generated when two objects rub against each other. The stick slip phenomenon is different from slidability of resins and has an independent property.

Since the styrene resins such as the ABS resin are amorphous resins, they are higher in coefficient of friction as compared with crystalline resins such as a polyethylene, a polypropylene and a polyacetal, and it is well known that, like a switch component of an instrument panel in an automobile or a sliding component of a business desk, when used to fit with another member, a stick slip phenomenon as illustrated in FIG. 1 occurs to generate unpleasant sounds (squeaking noises). The stick slip phenomenon is a phenomenon that is generated when two objects rub against each other. As illustrated by a model of FIG. 2(A), when an object M connected with a spring is placed on a driving table that moves at a driving speed V, the object M moves toward the right direction first as illustrated in FIG. 2(B) together with the table moving at the driving speed V by the action of a static frictional force. When the force by which the object M is to be restored to its original position becomes equal to the static frictional force, the object M starts to slip in the opposite direction to the driving speed V. At this time, the object M comes to receive a kinematic frictional force, and the slip is stopped when the force of the spring becomes equal to the kinematic frictional force as illustrated in FIG. 2(C), so that the object M comes again into a state where it attaches on the driving table and it moves again in the same direction as the driving speed V (FIG. 2(D)). This is called a stick slip phenomenon. As illustrated in FIG. 1, it has been said that if the difference $\Delta\mu$ between the coefficient of static friction $\mu s$ and the coefficient of friction $\mu 1$ of the lower end of a saw wavy form is large, squeaking noises tend to be generated easily. A dynamic friction coefficient is a middle value between $\mu s$ and $\mu l$. Therefore, even when the absolute value of the coefficient of static friction is small, squeaking noises tend to be generated if $\Delta\mu$ is large.

Those squeaking noises are a major cause that spoils comfortableness and silence in rooms of automobiles, offices and houses, and therefore reduction of squeaking noises is demanded strongly.

In order to solve the above-mentioned problems, it is known that an automobile interior component made from a thermoplastic resin composition obtained by blending the specific silicone oil with the specific rubber-modified vinyl resin is reduced remarkably in squeaking noises and the effects of reducing the squeaking noises are maintained even when placed at high temperatures for a long time, and further is superior in impact resistance (Patent document 1).

On the other hand, a component of an ABS resin is used as an automobile interior component, for example, a driver is often dazzled by sunlight reflected at the surface of the molded article, a measuring instrument is difficult to be watched by reflected light in the vicinity of the measuring instrument, or the like, and therefore, appearance superior in matting property is demanded from the viewpoint of safety. Moreover, in a housing, a chassis and the like of household electrical appliances, OA equipments and the like, appearance superior in matting property is demanded from the viewpoint of design.

It is known that a thermoplastic resin composition superior in matting property, impact resistance, heat resistance, dimensional stability and moldability and a molded article by an injection molding of this resin composition are obtained by blending the specific resin composition containing a crosslinked copolymer rubber with the resin composition comprising a polycarbonate resin or a polycarbonate resin and an ABS resin. (Patent document 2).

However, it is a real situation that a resin composition providing a molded article which is not only reduced in squeaking noises even when placed under high temperatures for a long time, but also superior in appearance in matting property has not yet been obtained.

PRIOR ART DOCUMENTS

Patent Documents

Patent document 1: Japanese Patent Laid-open Publication 2011-174029
Patent document 2: Japanese Patent Laid-open Publication 2009-256551

SUMMARY OF THE INVENTION

Problem to be Solved by the Invention

In view of such situations, an object of the present invention is to provide a contacting component comprising a molded article of a thermoplastic resin composition which is not only reduced remarkably in squeaking noises generated when comes into contact with and rubs against other members, but also superior in matting property, more specifically, a contacting component reduced in squeaking noises even when placed under high temperatures for a long time, and a structure containing the contacting component.

Solutions to the Problems

The present inventors have made an extensive series of studies in order to solve the above-described problems and, as a result, they found that a contacting component comprising a molded article of a thermoplastic resin composition containing a vinyl graft polymer, a vinyl non-graft polymer and a matting agent, the vinyl graft polymer containing an ethylene-α-olefin rubber polymer, and a structure including the contacting component are reduced remarkably in squeaking noises and superior in matting property. The present invention has been completed on this finding.

According to the present invention, the following contacting component and a structure including the contacting component, and a method for reducing squeaking noises by using the contacting component and the structure are provided.

1. A contacting component comprising a molded article made from a thermoplastic resin composition (X) containing a vinyl graft polymer (A), a vinyl non-graft polymer (B) and a matting agent (C), wherein:
the vinyl graft polymer (A) contains an ethylene-α-olefin rubber polymer (a1).
2. The contacting component according to the above-mentioned 1, wherein an amount of the vinyl graft polymer (A) is 1 to 40% by mass based on 100% by mass of the total amount of the vinyl graft polymer (A), the vinyl non-graft polymer (B) and the matting agent (C).
3. The contacting component according to the above-mentioned 1 or 2, wherein a melting point (measured according to JIS K 7121-1987) of the vinyl graft polymer (A) is present in a range of from 0 to 100° C.
4. The contacting component according to any one of the above-mentioned 1 to 3, wherein the vinyl graft polymer (A) contains the ethylene-α-olefin rubber polymer (a1) having a melting point (measured according to JIS K 7121-1987) in a range of from 0 to 100° C.
5. The contacting component according to any one of the above-mentioned 1 to 4, wherein the vinyl graft polymer (A) contains further a diene rubber polymer (a2).
6. The contacting component according to any one of the above-mentioned 1 to 5, wherein the vinyl graft polymer (A) and/or the vinyl non-graft polymer (B) contain a structural unit derived from an α,β-unsaturated glycidyl ester compound and an amount of the structural unit is 0.01 to 5% by mass based on 100% by mass of the total amount of the vinyl graft polymer (A), the vinyl non-graft polymer (B) and the matting agent (C).
7. The contacting component according to any one of the above-mentioned 1 to 6, wherein an amount of the matting agent (C) is 1 to 30% by mass based on 100% by mass of the total amount of the vinyl graft polymer (A), the vinyl non-graft polymer (B) and the matting agent (C).
8. The contacting component according to any one of the above-mentioned 1 to 7, wherein the matting agent (C) is a polymerization type matting agent (C1).
9. The contacting component according to the above-mentioned 8, wherein the matting agent (C1) is a resin composition (C2) which contains a copolymer resin (c1) of acylonitrile and styrene or α-methylstyrene and an ingredient (c2) containing an unsaturated nitrile-conjugated diene copolymer rubber and the copolymer rubber is crosslinked.
10. The contacting component according to any one of the above-mentioned 1 to 9, wherein a polycarbonate resin (D) is further contained.
11. The contacting component according to any one of the above-mentioned 1 to 10, wherein an amount of the polycarbonate resin (D) is 30 to 400% by mass based on 100% by mass of the total amount of the vinyl graft polymer (A), the vinyl non-graft polymer (B) and the matting agent (C).
12. The contacting component according to any one of the above-mentioned 1 to 11, wherein a noise risk value measured by a stick-slip measuring instrument SSP-02 manufactured by Ziegler-Instruments GmbH is 3 or less under the measuring conditions as set forth below:
Measuring Conditions:
A large size specimen having a length of 60 mm, a width of 100 mm and a thickness of 4 mm and a small size specimen having a length of 50 mm, a width of 25 mm and a thickness of 4 mm are prepared and a noise risk value is measured when the two specimens of the large size and the small size are rubbed against each other three times under the conditions of a temperature 23° C., a humidity 50% R.H., a load 40N, a speed 10 mm/second and an amplitude of vibration 20 mm.
13. A structure comprising at least two contacting components and at least one contacting component of which comprises the contacting component as defined in any one of the above-mentioned 1 to 12.
14. The structure according to the above-mentioned 13, which is a vehicle interior apparatus.
15. The structure according to the above-mentioned 13, which is a measuring instrument.
16. A method for reducing squeaking noises by using the contacting component defined in any one of the above-mentioned 1 to 12.
17. A method for reducing squeaking noises by using the structure defined in any one of the above-mentioned 13 to 15.

Advantageous Effects of the Invention

According to the present invention, by a molded article comprising a vinyl graft polymer, a vinyl non-graft polymer and a matting agent, the vinyl graft polymer containing an ethylene-α-olefin rubber polymer, a contacting component and a structure including the contacting component are provided which is reduced remarkably in squeaking noises and superior in matting property, more specifically, even when placed under high temperatures for a long time, a contacting component and a structure including the contacting component are provided which is not only reduced remarkably in squeaking noises, but also superior in matting property.

Further, according to the present invention, a method for reducing the squeaking noises by using the above-mentioned contacting component and the structure is also provided.

BRIEF DESCRIPTION OF THE DRAWINGS

FIG. 7 is a diagrammatic illustration showing another contacting embodiment.

FIG. 8 is a diagrammatic illustration showing another contacting embodiment.

FIGS. 9(A), 9(B) and 9(C) are diagrammatic illustrations showing another contacting embodiment.

FIG. 10 is a diagrammatic illustration showing another contacting embodiment.

FIGS. 11(A), 11(B) and 11(C) are diagrammatic illustrations showing another contacting embodiment.

EMBODIMENTS OF THE INVENTION

Figure 1:
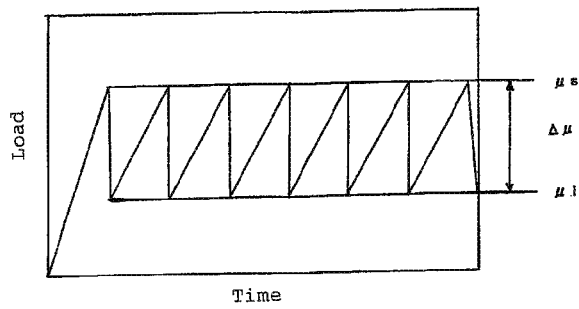
FIG. 1 is an explanatory diagram of a stick slip phenomenon.
Figure 2A:
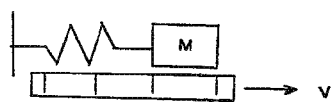
FIGS. 2(A), 2(B), 2(C) and 2(D) are model diagrams of a stick slip phenomenon.
Figure 2B:
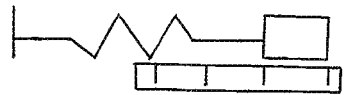
Figure 2C:
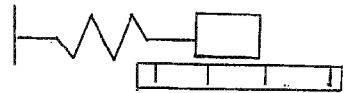
Figure 2D:

The contacting component of the present invention comprises a molded article of a thermoplastic resin composition (X) containing a vinyl graft polymer (A), a vinyl non-graft polymer (B) and a matting agent (C), further, if necessary, a polycarbonate resin (D), in which the above-mentioned vinyl graft polymer (A) contains an ethylene-α-olefin rubber polymer (a1) and further, if necessary, a diene rubber polymer (a2).

Meanwhile, in the present specification, "polymer" means homopolymer and copolymer. Moreover, "(meth)acrylic" means acrylic and/or methacrylic, and "(meth)acrylate" means acrylate and/or methacrylate.

Hereinafter, the present invention will be explained in detail.

1. Vinyl Graft Polymer (A) and Vinyl Non-Graft Polymer (B) (Hereinafter Referred to Also as "Ingredient (A)", "Ingredient (B)"):

The vinyl graft polymer (A) contains the ethylene-α-olefin rubber polymer (a1) and the vinyl graft polymer (A1) including a structural unit derived from aromatic vinyl compounds, and further, if necessary, the diene rubber polymer (a2) and the vinyl graft polymer (A2) including a structural unit derived from aromatic vinyl compounds.

The vinyl graft polymer (A1) contains usually a rubber polymer part containing the ethylene-α-olefin rubber polymer (a1) and a polymer part (graft part) including a structural unit derived from aromatic vinyl compounds, and the polymer part is a composition grafted onto the rubber polymer part. The polymer part constituting the graft part may include, besides the structural unit derived from the aromatic vinyl compounds, the structural unit derived from other vinyl compounds copolymerizable with the aromatic vinyl compounds. The polymer part grafted onto the rubber polymer is inspected by the measurement of a graft ratio to be stated later, a well-known ozonolysis method, observation of morphology by an electron microscope and the like.

The vinyl graft polymer (A1) can be obtained representatively by producing the rubber-reinforced aromatic vinyl resin (P1) in which a vinyl monomer (b1) including aromatic vinyl compounds is graft polymerized in the presence of the ethylene-α-olefin rubber polymer (a1). The mass ratio of the ingredient (a1) and the ingredient (b1) is usually 5-80:95-20, and preferably 10-75:90-25 from the viewpoint of productivity of the ingredient (P1) and impact resistance, appearance or the like of the molded article obtained.

The rubber-reinforced vinyl resin (P1) is usually a composition containing the vinyl graft polymer (A1) in which onto the ethylene-α-olefin rubber polymer (a1), the polymer including the structural unit derived from the vinyl monomer (b1) is graft polymerized, and the free polymer (B1) which comprises the polymer including the structural unit derived from the vinyl monomer (b1) non-grafted onto the ethylene-α-olefin rubber polymer (a1). The rubber-reinforced vinyl resin (P1) may further include the ethylene-α-olefin rubber polymer (a1) onto which the polymer is not grafted.

The vinyl graft polymer (A2) contains usually a rubber polymer part containing the diene rubber polymer (a2) and a polymer part (graft part) including a structural unit derived from aromatic vinyl compounds, and the polymer part is a composition grafted onto the rubber polymer part. The polymer part constituting the graft part may include, besides the structural unit derived from the aromatic vinyl compounds, the structural unit derived from other vinyl compounds copolymerizable with the aromatic vinyl compounds. The polymer part grafted onto the rubber polymer is inspected by the measurement of a graft ratio to be stated later, a well-known ozonolysis method, observation of morphology by an electron microscope and the like.

The vinyl graft polymer (A2) can be obtained representatively by producing the rubber-reinforced aromatic vinyl resin (P2) in which a vinyl monomer (b2) including aromatic vinyl compounds is graft polymerized in the presence of the diene rubber polymer (a2). The mass ratio of the ingredient (a2) and the ingredient (b2) is usually 5-80:95-20, and preferably 10-75:90-25 from the viewpoint of productivity of the ingredient (P2) and impact resistance, appearance or the like of the molded article obtained.

The rubber-reinforced vinyl resin (P2) is usually a composition containing the vinyl graft polymer (A2) in which onto the diene rubber polymer (a2), the polymer including the structural unit derived from the vinyl monomer (b2) is graft polymerized, and the free polymer (B2) which comprises the polymer including the structural unit derived from the vinyl monomer (b2) non-grafted onto the diene rubber polymer (a2). The rubber-reinforced vinyl resin (P2) may further include the ethylene-α-olefin rubber polymer (a2) onto which the polymer is not grafted.

The vinyl non-graft polymer (B) is a polymer including a structural unit derived from aromatic vinyl compounds and does not contain a rubber polymer. The vinyl non-graft polymer (B) may contain, besides the structural unit of the aromatic vinyl compounds, structural units derived from the other vinyl compounds copolymerizable with the aromatic vinyl compounds.

The vinyl non-graft polymer (B) is usually a polymer (B3) representatively obtained by polymerizing a vinyl monomer (b3) including aromatic vinyl compounds in the absence of a rubber polymer. Meanwhile, a free polymer (B1) included in the rubber-reinforced aromatic vinyl resin (P1), a free polymer (B2) included in the rubber-reinforced aromatic vinyl resin (P2) are included in the vinyl non-graft polymer (B).

The ethylene-α-olefin rubber polymer (a1) constituting the rubber ingredient of the vinyl graft polymer (A1) may be used singly or in combination of two or more. In case where the rubber ingredient is the ethylene-α-olefin rubber polymer (a1), the squeaking noises are not generated even after being heat aged for a long time and is superior in reduction of the squeaking noises.

It is preferred that the vinyl graft polymer (A) used in the present invention has a Tm (melting point).

The Tm measured according to JIS K 7121-1987 is preferably 0 to 100° C., more preferably 0 to 90° C., still more preferably 10 to 80° C., particularly preferably 20 to 80° C. The Tm is measured by DSC (differential scanning calorimetry) in which an endothermic change is measured at a constant heating rate of 20° C./minute and a peak temperature of the obtained endothermic pattern is read, and the particulars are described in JIS K7121-1987. In cases where the Tm is in a range of from 0 to 100° C., the reduction effect of squeaking noises is more remarkable and thus preferable. The presence of melting point (Tm) in the vinyl graft polymer (A) indicates that it has a crystalline part. The presence of a crystalline part suppresses occurrence of a stick slip phenomenon, and as a result, generation of squeaking noises is presumably suppressed. Meanwhile, if the vinyl graft polymer (A) having the Tm in a range of from 0 to 100° C. exists, it may have further a Tm in a range outside of 0 to 100° C. Moreover, the vinyl graft polymer (A) may have a plurality of Tms in a range of from 0 to 100° C.

It is preferred that the ethylene-α-olefin rubber polymer (a1) used in the present invention has a Tm (melting point).

The Tm measured according to JIS K 7121-1987 is preferably 0 to 100° C., more preferably 0 to 90° C., still more preferably 10 to 80° C., particularly preferably 20 to 80° C. In cases where the Tm of the ingredient (a1) is present in a range of from 0 to 100° C., the reduction effect of squeaking noises is more remarkable and thus preferable. The measurement of melting point of the ingredient (a1) may be made in the same manner as in the measurement of the Tm (melting point) of the vinyl graft polymer (A). Meanwhile, if the ethylene-α-olefin rubber polymer (a1) has the Tm in a range of from 0 to 100° C., it may have further a Tm in a range outside of 0 to 100° C. Moreover, the ethylene-α-olefin rubber polymer (a1) may have a plurality of Tms in a range of from 0 to 100° C.

Further, glass transition temperature (Tg) of the ethylene-α-olefin rubber polymer (a1) is preferably −20° C. or lower, more preferably −30° C. or lower, particularly preferably −40° C. or lower from the viewpoint of impact resistance. Meanwhile, the glass transition temperature can be obtained in the same manner as in Tm (melting point), using DSC (differential scanning calorimetry) according to JIS K7121-1987.

The α-olefin constituting the ethylene-α-olefin rubber polymer (a1) may include, for example, α-olefins having 3 to 20 carbon atoms, and specifically propylene, 1-butene, 1-pentene, 1-hexene, 4-methyl-1-pentene, 1-heptene, 1-octene, 1-decene, 1-dodecene, 1-hexadecene and 1-eicocene and the like. These α-olefins may be used singly or in combination of two or more. The number of carbon atoms of the α-olefin is preferably 3 to 20, more preferably 3 to 12, and even more preferably 3 to 8 from the viewpoint of copolymerizability and appearance of the molded article. The mass ratio of ethylene:α-olefin is usually 5 to 95:95 to 5, preferably 50 to 95:50 to 5, and more preferably 60 to 95:40 to 5 from the viewpoint of impact resistance of the contacting component.

The ethylene-α-olefin rubber polymer (a1) may be an ethylene-α-olefin-nonconjugated diene copolymer. As the nonconjugated diene components, alkenylnorbornenes, cyclic diens and aliphatic diens may be exemplified, and among those, 5-ethylidene-2-norbornene and dicyclopentadiene are preferable. These nonconjugated diens may be used singly or in combination of two or more. The amount of the nonconjugated diene to the whole amount of the ingredient (a1) is usually 0 to 10% by mass, preferably 0 to 5% by mass and more preferably 0 to 3% by mass from the viewpoint of obtaining the sufficient reduction effect of the squeaking noises. As the amount of the nonconjugated dienes in the component (a1) increases, the crystallizability of the rubber polymer lowers and the melting point (Tm) sometimes disappears, and consequently, sufficient reduction effect of the squeaking noises tend not to be obtained.

The Mooney viscosity ($ML_{1+4}$, at 100° C.; in accordance with JIS K6300) of the ethylene-α-olefin rubber polymer (a1) is usually 5 to 80, preferably 5 to 40, and more preferably 5 to 35 from the viewpoint of fluidity of the obtained rubber-reinforced aromatic vinyl resin and impact resistance of the obtained molded article.

As the ethylene-α-olefin rubber polymer (a1), those not including the nonconjugated dien components are preferable from the viewpoint of reduction of the squeaking noises, and among those, ethylene-propylene copolymers, ethylene-1-butene copolymers and ethylene-1-octene copolymers are more preferable, and the ethylene-propylene copolymers are particularly preferable.

As the diene rubber polymer (a2), homopolymers such as polybutadiene and polyisoprene; butadiene-based copolymers such as styrene-butadiene copolymers, styrene-butadiene-styrene copolymers, acrylonitrile-styrene-butadiene copolymers and acrylonitrile-butadiene copolymers; isoprene-based copolymers such as styrene-isoprene copolymers, styrene-isoprene-styrene copolymers and acrylonitrile-styrene-isoprene copolymers may be exemplified. These may be either random copolymers or block copolymers, and may be used singly or in combination of two or more. The diene rubber polymer (a2) may be either cross-linked polymers or non-crosslinked polymers.

As the vinyl monomers (b1), (b2) and (b3), the aromatic vinyl compound is used as an essential ingredient and preferably at least one selected from vinyl cyanide compounds and (meth)acrylic ester compounds may be used additionally. Further, other vinyl monomers copolymerizable with those compounds may, if necessary, be used additionally. As the other vinyl monomers, maleimide compounds, anhydrides of unsaturated acids, carboxyl group-containing unsaturated compounds, hydroxyl group-containing unsaturated compounds, oxazoline group-containing unsaturated compounds and the like may be exemplified. These may be used singly or in combination of two or more.

As the above-mentioned aromatic vinyl compounds, styrene, α-methylstyrene, o-methylstyrene, p-methylstyrene, β-methylstyrene, ethylstyrene, p-tert-butylstyrene, vinyl-toluene, vinylxylene, vinylnaphthalene and the like may be exemplified. These may be used singly or in combination of two or more. Among these, styrene and α-methylstyrene are preferred and styrene is particularly preferred.

As the above-mentioned vinyl cyanide compounds, acrylonitrile, methacrylonitrile, ethacrylonitrile, α-ethyl acrylonitrile, α-isopropyl acrylonitrile and the like may be exemplified. These may be used singly or in combination of two or more. Among these, acrylonitrile is preferred.

As the above-mentioned (meth)acrylic acid ester compounds, methyl (meth) acrylate, ethyl (meth) acrylate, n-propyl (meth) acrylate, isopropyl (meth) acrylate, n-butyl (meth) acrylate, isobutyl (meth) acrylate, sec-butyl (meth) acrylate, tert-butyl (meth) acrylate, hexyl (meth) acrylate, n-octyl (meth) acrylate, 2-ethylhexyl (meth) acrylate, cyclohexyl (meth) acrylate, phenyl (meth) acrylate and benzyl (meth) acrylate and the like may be exemplified. These may be used singly or in combination of two or more. Among these, methyl methacrylate is preferred.

As the above-mentioned maleimide compounds, N-phenylmaleimide, N-cyclohexylmaleimide and the like may be exemplified. These may be used singly or in combination of two or more.

As the above-mentioned halides of unsaturated acids, maleic anhydride, itaconic anhydride and citraconic anhydride and the like may be exemplified. These may be used singly or in combination of two or more.

As the above-mentioned carboxyl group-containing unsaturated compounds, (meth) acrylic acid, (eth)acrylic acid, maleic acid, fumaric acid, itaconic acid, crotonic acid and cinnamic acid and the like may be exemplified. These may be used singly or in combination of two more.

As the above-mentioned hydroxyl group-containing unsaturated compounds, 3-hydroxy-1-propene, 4-hydroxy-1-butene, cis-4-hydroxy-2-butene, trans-4-hydroxy-2-butene, 3-hydroxy-2-methyl-1-propene, 2-hydroxyethyl (meth) acrylate, 2-hydroxypropyl (meth) acrylate, 3-hydroxypropyl (meth) acrylate and the like may be exemplified. These may be used singly or in combination of two or more.

The lower limit of the amount of the above-mentioned aromatic vinyl compound is preferably 40% by mass, more preferably 50% by mass, still more preferably 60% by mass based on 100% by mass of the total amount of the vinyl monomer (b1). The upper limit is usually 100% by mass.

When the vinyl monomers (b1), (b2) and (b3) include the aromatic vinyl compound and the vinyl cyanide compound, each amount of the both compounds is usually 40 to 90% by mass and 10 to 60% by mass, preferably 55 to 85% by mass and 15 to 45% by mass based on 100% by mass of the total amount of the both compounds from the viewpoint of moldability, and heat resistance, chemical resistance and mechanical strength of the obtained molded article.

The methods for producing the rubber-reinforced aromatic vinyl resins (P1) and (P2) are not limited specifically and known methods are applied. As the polymerization method, an emulsion polymerization, a suspension polymerization, a solution polymerization, a bulk polymerization or a combined method thereof may be used. In those polymerization methods, an appropriate polymerization initiator, a chain transfer agent (molecular weight modifier), an emulsifier and the like may be used.

The graft ratios of the rubber-reinforced aromatic vinyl resin (P1) and (P2) are each usually 10 to 150%, preferably 15 to 120%, still more preferably 20 to 100%, and particularly preferably 30 to 80%. If the graft ratio of the component (A) is in the above-mentioned range, moldability of the resin composition and impact resistance of the resin composition become more superior and thus preferable.

The graft ratio can be calculated by the following formula (1).

$$\text{Graft ratio (\% by mass)} = \{(S-T)/T\} \times 100 \tag{1}$$

In the above formula, S is a mass (g) of an insoluble fraction obtained by charging 1 gram of a rubber-reinforced aromatic vinyl resin (P1) or (P2) into 20 ml of acetone then shaking the mixture for 2 hours with a shaker under a temperature condition of 25° C., and then centrifuging the mixture for 60 minutes with a centrifugal separator (rotation speed; 23,000 rpm) under a temperature condition of 5° C., thereby separating the insoluble fraction and the soluble fraction, and T is a mass (g) of the rubber polymer (a) contained in 1 g of the ingredient (P1) or (P2). The mass of the rubber polymer (a) can be determined by a method of calculating it from a polymerization formulation and a polymerization conversion, a method of determining it from an infrared absorption spectrum (IR), a pyrolysis gas chromatography, a CHN elemental analysis and so on.

The graft ratio can be adjusted by appropriately selecting the type and the amount of the chain transfer agent, the type and the amount of the polymerization initiator which are used at the time of producing the rubber-reinforced aromatic vinyl resins (P1) and (P2), the addition method and the addition time of the monomer ingredients, the polymerization temperature and the like at the time of the polymerization.

The intrinsic viscosity [η] (measured at 30° C. in methyl ethyl ketone) of the acetone-soluble fraction of each of the rubber-reinforced aromatic vinyl resins (P1) and (P2) is usually 0.1 to 1.5 dl/g, preferably 0.15 to 1.2 dl/g, and more preferably 0.15 to 1.0 dl/g. When the intrinsic viscosity [η] of the rubber-reinforced aromatic vinyl resin (P1) or (P2) is within the above range, moldability of the thermoplastic resin composition (X) and impact resistance of the obtained molded article become more excellent and thus preferable.

The measurement of the intrinsic viscosity [η] the acetone-soluble fraction of each of the rubber-reinforced aromatic vinyl resins (P1) and (P2) was performed by the following method. First, the acetone-soluble fraction of each of the ingredients (P1) and (P2) was dissolved in methyl ethyl ketone, so that five solutions differing in concentration were prepared. A reduced viscosity was measured using a Ubbelohde viscosity tube at each concentration at 30° C., and from the measurement results an intrinsic viscosity [η] was determined. The unit is dl/g.

The intrinsic viscosity can be adjusted by appropriately choosing the type and the amount of the chain transfer agent, the type and the amount of the polymerization initiator, which are used at the time of producing the rubber-reinforced aromatic vinyl resins (P1) and (P2), the addition method and the addition time of the monomer components, the polymerization temperature and the like at the time of polymerization. It can be also adjusted by appropriately blending an ingredient (B3) having a different intrinsic viscosity.

As the vinyl non-graft polymer (B), it is also possible to use a polymer (ingredient (B3)) which is obtained by polymerizing a vinyl monomer (b3) including aromatic vinyl compounds in the absence of the rubber polymer, besides free polymers (B1) and (B2) derived from the rubber-reinforced aromatic vinyl resins (P1) and (P2). As the method for polymerizing the ingredient (B3), those mentioned in the production of the rubber-reinforced aromatic vinyl resins (P1) and (P2) can be used.

As the vinyl monomer (b3), all of the monomers mentioned as the vinyl monomers (b1) and (b2) can be used. The vinyl monomer (b3) is preferably at least one selected from aromatic vinyl compounds, vinyl cyanide compounds and (meth) acrylic ester compounds. The component (B3) may be used singly or in combination of two or more.

When the vinyl monomers (b3) includes the aromatic vinyl compound and the vinyl cyanide compound, each amount of the both compounds is usually 40 to 90% by mass and 10 to 60% by mass, preferably 55 to 85% by mass and 15 to 45% by mass based on 100% by mass of the total amount of the both compounds from the viewpoint of moldability, and heat resistance, chemical resistance and mechanical strength of the obtained molded article.

The intrinsic viscosity [η] (measured at 30° C. in methyl ethyl ketone) of the polymer (B3) of the vinyl monomer (b3) is preferably 0.2 to 0.9 dl/g, more preferably 0.25 to 0.85 dl/g, and still more preferably 0.3 to 0.8 dl/g.

The measurement of the intrinsic viscosity [η] of the above-mentioned ingredient (B3) was performed by the following method. First, the ingredient (B3) was dissolved in methyl ethyl ketone, so that five solutions differing in concentration were prepared. A reduced viscosity was measured using a Ubbelohde viscosity tube at each concentration at 30° C., and an intrinsic viscosity [η] was determined.

The ingredient (A) and/or the ingredient (B) may include, if necessary, those modified with α,β-unsaturated glycidyl ester compounds. By including those modified with α,β-unsaturated glycidyl ester compounds, matting property is enhanced remarkably. As the α,β-unsaturated glycidyl ester compound, glycidyl acrylate, glycidyl methacrylate, glycidyl ethacrylate and the like may be exemplified. These may be used singly or in combination of two or more.

2. Matting Agent (C) (Hereinafter Referred to Also as "Ingredient (C)":

As the matting agent (C) used in the present invention, inorganic and organic matting agent in powdery, particulate, irregular, microballoon, fibrous, whisker or fine particulate shape may be exemplified. For example, as the powdery, particulate or irregular shape, calcium carbonate, talc, silicic acid, silicate, asbestos, mica and the like; as the microballoon shape, glass balloon, phenolic resin balloon and the like; as the fibrous shape, glass fiber, carbon fiber, metallic fiber and the like; as the whisker shape, ceramic whisker, titanium whisker and the like; as the fine particulate shape, plastic fine particles such as polyolefin fine particles of polyethylene and/or polypropylene and the like may be exemplified.

As the organic matting agent (however, ingredients (A) and (B) are excluded), for example, a polymerization type matting agent (C1) may be exemplified. The polymerization type matting agent (C1) is not limited specifically if it has matting property, and, for example, crosslinked vinyl polymers excluding the ingredients (A) and (B), (crosslinked) rubber polymers, copolymer resins modified with diene rubbers may be exemplified.

As the crosslinked vinyl polymer, crosslinked polyacrylic resins, crosslinked AS resins and the like may be exemplified. The organic matting agent provides a molded article with an excellent matte appearance while maintaining mechanical strength and moldability and is thus preferable. The volume average particle diameter of the organic matting agent existing in the resin composition is preferably 0.5 to 25 μm, more preferably 0.5 to 20 μm, still more preferably 1 to 15 μm. The shape may be either a particulate shape or an irregular shape like ameba.

As the preferable polymerization type matting agent, for example, a resin composition (C2) containing a copolymer resin (c1) of acrylonitrile and styrene or α-methylstyrene and an ingredient (c2) containing an unsaturated nitrile-conjugated diene copolymer rubber, the copolymer rubber of which is crosslinked is exemplified. This resin composition (C2) is produced by, for example, Japanese Patent No. 2576863 and Japanese Patent Laid-Open Publication No. 2010-1377.

The ingredient (c2) containing the copolymer rubber may include, besides the unsaturated nitrile-conjugated diene copolymer rubber, other rubbers crosslinkable with a crosslinking agent. The amount may be determined appropriately, and, for example, the amount of the other rubbers is 0 to 90% by mass based on 10 to 100% by mass of the unsaturated nitrile-conjugated diene copolymer rubber in the ingredient (c2).

As the unsaturated nitrile-conjugated diene copolymer rubber used in the present invention, a copolymer rubber comprising 10 to 50% by mass of an unsaturated nitrile and 90 to 50% by mass of a conjugated diene is preferable. As the unsaturated nitrile, acrylonitrile, methacrylonitrile and the like may be exemplified. As the conjugated diene, 1,3-butadiene, 2,3-dimethyl butadiene, isoprene, 1,3-pentadiene and the like may be exemplified.

The conjugated diene of the unsaturated nitrile-conjugated diene copolymer rubber may be substituted partly with other monomers copolymerizable in a range where the essence of the present invention is not impaired. Such monomer may include aromatic vinyls such as styrene and α-methylstyrene; alkyl acrylates such as methyl acrylate, ethyl acrylate, butylacrylate and 2-ethylhexyl acrylate; alkoxy acrylates such as methoxymethyl acrylate, methoxyethyl acrylate, ethoxyethyl acrylate, butoxyethyl acrylate and methoxyethoxyethyl acrylate; unsaturated carboxylic acids such as acrylic acid, methacrylic acid, itaconic acid and maleic acid and alkaline metal salts thereof; salts such as ammonium salts; (meth) acrylic acid cyano-substituted alkyl esters such as cyanomethyl (meth) acrylate, 2-cyanoethyl (meth) acrylate, 3-cyanopropyl (meth) acrylate and 4-cyanobutyl (meth) acrylate and the like. Monomers other than exemplified above may also be used if they are copolymerizable with the unsaturated nitrile and the conjugated diene.

The unsaturated nitrile-conjugated copolymer rubber may include acrylonitrile-butadiene copolymer rubbers, acrylonitrile-isoprene copolymer rubbers, acrylonitrile-butadiene-isoprene copolymer rubbers, acrylonitrile-butadiene-acrylic acid copolymer rubbers and the like. Further, rubbers obtained by hydrogenating the conjugated diene unit in those rubbers may also be exemplified.

The other rubbers which may be used in combination with the unsaturated nitrile-conjugated diene copolymer rubber are rubbers which can be crosslinked with a crosslinking agent such as a sulfur vulcanization type, a peroxide vulcanization type and the like that are usually used. Examples may include conjugated diene polymer rubbers such as polybutadiene rubbers, styrene-butadiene copolymer rubbers (random, block), natural rubbers, polyisoprene rubbers, polychloroprene rubbers, hydrides thereof, and EPDM and the like.

When the unsaturated nitrile-conjugated diene copolymer rubber and the above-mentioned other rubbers are used in combination, the amount of the unsaturated nitrile-conjugated diene copolymer rubber in the mixed rubbers is 10 to 100% by mass and preferably 20 to 100% by mass. In cases of less than 10% by mass, the effect of improving matting property tends to be insufficient.

When the mixed rubber is used as the ingredient (c2), two or more of rubbers are mixed beforehand, then mixed with the copolymer resin (c1), or those may be added to the copolymer resin (c1) simultaneously or separately.

In the present invention, it is important that the ingredient (c2) including the copolymer rubber is crosslinked with a crosslinking agent in the ingredient (C2).

As the vulcanization method of the ingredient (c2) including the copolymer rubber, it is particularly preferred to conduct so-called dynamic vulcanization, i.e., the rubber ingredient is vulcanized in the presence of the crosslinking agent of the rubber ingredient in the step of mixing the copolymer resin (c1) and the ingredient (c2) including the copolymer rubber.

The crosslinking method by the dynamic vulcanization is conducted specifically by adding the crosslinking agent of the rubber ingredient after the copolymer resin (c1) and the ingredient (c2) including the copolymer rubber are melted and mixed beforehand, melting the copolymer resin (c1), and continuing the mixing at a temperature and a time which are required to vulcanize the rubber ingredient. The temperature and the time for the vulcanization of the rubber ingredient are varied with the kind of the rubber ingredient and the kind of the crosslinking agent and thus those are determined appropriately by selecting the vulcanization conditions by a preliminary experiment and the like. Usually, it may be conducted under conditions of 150 to 230° C. and 5 to 10 minutes.

The polymers including dispersed rubber particles such as the rubber-reinforced aromatic vinyl resin (P) and the like has a fear of suffering heat deterioration under the temperature of the dynamic vulcanization. Accordingly, it is preferred to produce the ingredient (C2) including the vulcanized rubber ingredient by mixing the copolymer resin (c1) and the ingredient (c2) containing the copolymer rubber, not including the dispersed rubber particles, and crosslinking the rubber ingredient by the dynamic vulcanization method.

The degree of vulcanization of the rubber ingredient in the ingredient (C2) used in the present invention is preferable 80% or more in gel fraction (insoluble fraction when the crosslinked rubber ingredient was immersed in methyl ethyl ketone at 25° C. for 48 hours). Moreover, the rubber ingredient in the ingredient (C2) is preferred to be dispersed as particles of 10 μm or less, preferably 1 to 5 μm in the thermoplastic resin composition of the present invention from the viewpoint of matting property and impact resistance.

The crosslinking agent used in the production of the ingredient (C2) is not limited specifically if the rubber ingredient is crosslinked. The crosslinking agent may include usually a sulfur vulcanization type such as sulfur and/or a sulfur-donating compound (for example, thiuram compounds such as tetramethylthiuram disulfide, tetraethylthiuram disulfide etc.; morpholine compounds such as morpholine disulfide etc.), vulcanization aids (for example, zinc oxide, magnesium oxide, stearic acid, zinc stearate, etc.), vulcanization accelerators (for example, guanizine compounds such as diphenylguanizine etc.; thiazole compounds such as mercaptobenzothiazole, benzothiazyl disulfide, cyclohexylbenzothiazyl sulfenamide etc.), and an organic peroxide type such as dicumyl peroxide, 2,5-dimethyl-2,5-di-(t-butyl peroxy)-hexane, 2,5-dimethyl-2,5-di-(t-butylperoxy-hexine-3,1,3-bis (t-butylperoxy-isopropyl) benzene etc.

These crosslinking agents are preferably used selecting appropriately the amount in such a manner that the gel fraction of the crosslinked rubber ingredient is 80% or more.

3. Thermoplastic Resin Composition (X):

The thermoplastic resin composition (X) is obtained by mixing the vinyl graft polymer (A) and the vinyl non-graft polymer (B) constituting the rubber-reinforced aromatic vinyl resin (P) and the matting agent (C) and melt-kneading them.

The amount of the vinyl graft polymer (A) is preferably 1 to 40% by mass, more preferably 2 to 35% by mass and further preferably 3 to 30% by mass based on 100% by mass of the total amount of the vinyl graft polymer (A), the vinyl non-graft polymer (B) and the matting agent (C) from the viewpoint of the reduction of squeaking noises.

The amount of the matting agent (C) is preferably 1 to 30% by mass, more preferably 1 to 20% by mass and further preferably 1 to 10% by mass based on 100% by mass of the total amount of the vinyl graft polymer (A), the vinyl non-graft polymer (B) and the matting agent (C) from the viewpoint of the reduction of squeaking noises.

Meanwhile, the amount of the vinyl non-graft polymer (B) is the residue which is calculated from the amounts of the above-mentioned vinyl graft polymer (A) and the matting agent (C).

Further, when the ingredient (A) and/or the ingredient (B) include the structural unit derived from α,β-unsaturated glycidyl ester compounds, the amount of the structural unit is usually 0.01 to 5% by mass, preferably 0.02 to 3% by mass and more preferably 0.1 to 2% by mass based on 100% by mass of the total amount of the ingredient (A), the ingredient (B) and the ingredient (C) from the viewpoint of matting property.

The amount of the ethylene-α-olefin rubber polymer (a1) in the ingredient (A) is 5 to 30% by mass, preferably 5 to 25% by mass and particularly preferably 5 to 20% by mass based on 100% by mass of the above-mentioned thermoplastic resin composition (X) from the viewpoint of the reduction of squeaking noises and impact resistance.

When the ingredient (A) includes the ethylene-α-olefin rubber polymer (a1) and the diene rubber polymer (a2) and impact resistance is considered more important particularly while maintaining the reduction of squeaking noises, the mass ratio of the ingredient (a1): the ingredient (a2) is preferably 5 to 80:35 to 20, more preferably 10 to 60:90 to 40 and particularly preferably 15 to 40:85 to 60.

The thermoplastic resin composition [X] of the present invention may contain, if necessary, various additives such as a filler other than the ingredient (C), a nucleating agent, a lubricant, a heat stabilizer, an antioxidant, a UV absorber, an antiaging agent, a plasticizer, an antibacterial agent and a colorant, as far as the object of the present invention is not impaired.

Moreover, the thermoplastic resin composition [X] of the present invention may contain, if necessary, other resins, for example, styrene resins other than the ingredients (A), (B) and (C) of the present invention, polyethylene, polypropylene, polybutylene terephthalate, polyethylene terephthalate, polyphenylene sulfide, polyamide, polycarbonate resin, etc., as far as the object of the present invention is not impaired. Among those, the polycarbonate resin is preferable from the viewpoint of impact resistance. The amount of the polycarbonate resin (D) is usually 30 to 400% by mass, preferably 60 to 300% by mass and more preferably 75 to 250% by mass based on 100% by mass of the total amount of the ingredient (A), the ingredient (B) and the ingredient (C).

The thermoplastic resin composition [X] of the present invention can be produced by mixing respective components in a prescribed incorporation ratio by using a Tumbler mixer or a Henschel mixer, and then melt-kneading them under appropriate conditions by using a mixing machine such as a single screw extruder, a twin screw extruder, a Banbury mixer, a kneader, a roll and a feeder ruder. A preferred kneading machine is a twin screw extruder. In kneading respective components, it is permissible to knead the respective components at one time and it is also permissible to incorporate and knead them dividedly in multiple stages. Moreover, it is also possible to perform pelletization by using an extruder after kneading with a Banbury mixer, a kneader, or the like. Among fillers, in the case of one in a fibrous form it is preferred to use a method of feeding it at the way of an extruder by the use of a side feeder in order to prevent cutting during kneading. The melt-kneading temperature is usually 200 to 300° C., and preferably 220 to 280° C.

The thermoplastic resin composition [X] has preferably a noise risk value of 5 or less, more preferably 3 or less measured by a stick-slip measuring instrument "SSP-02" manufactured by Ziegler-Instruments GmbH (under the conditions of 23° C. in temperature and 50% in humidity R.H., 5N and 40N in load and 1 mm/sec and 10 mm/sec in speed) by use of the contacting components made of the thermoplastic resin compositions to be described later. According to the criteria of the German Automobile Industry Association (VD A 203-260), if the noise risk value is 3 or less, the criteria is passed practically. The noise risk value can be met by adjusting appropriately the amounts of the ingredients (A), (B), (C) and (D) if necessary.

The thermoplastic resin composition (X) of the present invention has preferably a Tm (melting point) in a range of from 0 to 100° C. Here, Tm is measured by DSC (differential scanning calorimetry) in which an endothermic change is measured at a constant heating rate of 20° C./minute and a peak temperature of the obtained endothermic pattern is read. The particulars are described in JIS K7121-1987. The Tm is preferably 0 to 90° C., more preferably 10 to 80° C. and particularly preferably 20 to 80° C. from the viewpoint of reduction of the squeaking noises. Meanwhile, the thermoplastic resin composition (X) may have another melting point in the temperature range other than 0 to 100° C. if it has a Tm in a range of from 0 to 100° C. Further, the thermoplastic resin composition (X) may have a plurality of Tms in a range of from 0 to 100° C. The Tm can be adjusted by selecting appropriately the kind and the amount of the ethylene-α-olefin rubber polymer (a) used in the rubber-reinforced aromatic vinyl resin (P).

4. Molded Article

The molded article obtained by molding the thermoplastic resin composition (X) is useful as a contacting component in which two contacting components come into contact with each other or a structure including the contacting components. Specifically, by using at least one component of a structure comprising at least two components coming into contact with each other, the generation of the squeaking noises in the structure can be suppressed. Therefore, according to the present invention, goods including a structure which includes at least two components coming into contact with each other and at least one component comprising a molded article of the thermoplastic resin composition (X) are provided. Preferably, at least two components comprise molded articles of the thermoplastic resin composition (X) of the present invention and specifically preferably, all components comprise molded articles of the thermoplastic resin composition (X) of the present invention.

There are no limitations in the method for producing the above-mentioned molded articles or contacting components of the present invention from the thermoplastic resin composition [X], and it can be produced by a conventional method such as injection molding, injection compression molding, gas assisted injection molding, press molding, calender molding, T-die extrusion molding, profile extrusion molding, film molding and the like.

There are no particular limitations with respect to the materials constituting other contacting components other than the contacting component comprising the molded article molded from the thermoplastic resin composition [X] and examples thereof are a thermoplastic resin other than the thermoplastic resin composition [X] of the present invention, a thermosetting resin, a rubber, an organic material, an inorganic material and a metallic material.

The thermoplastic resin other than the thermoplastic resin composition (X) of the present invention may include polyvinyl chloride, polyethylene, polypropylene, AS resin, ABS resin, AES resin, ASA resin, polymethyl methacrylate (PMMA), polystyrene, high impact polystyrene, EVA, polyamide (PA), polyethylene terephthalate, polybutylene terephthalate, polycarbonate (PC), polylactic acid, PC/ABS, PC/AES and the like. These can be used singly or in combination of two or more.

The thermosetting resin may include phenolic resin, epoxy resin, urea resin, melamine resin, unsaturated polyester resin and the like. These can be used singly or in combination of two or more.

The rubber may include various synthetic rubbers such as chloroprene rubber, polybutadiene rubber, ethylene-propylene rubber, SEBS, SBS and SIS, and natural rubbers. These can be used singly or in combination of two or more.

The organic material may include an insulation board, an MDF (medium density fiberboard), a hard board, a particle board, a lumber core, an LVL (laminated veneer lumber), an OSB (oriented stack board), a PSL (Para-Lum), a WB (wafer board), a hard fiber board, a soft fiber board, a lumber core plywood, a board core plywood, a special core plywood, a veneer core plywood, a stack sheet/board of paper impregnated with a tap resin, a board produced by mixing an adhesive with fine chips/strips prepared by breaking (used) paper, and then compressing the mixture under heating, and various types of wood. These can be used singly or in combination of two or more.

The inorganic material may include a calcium silicate board, a flexible board, a homocement board, a gypsum board, a sheathing gypsum board, a reinforced a gypsum board, a gypsum lath board, a decorated gypsum board, a composite gypsum board, various ceramics and glass. These can be used singly or in combination of two or more.

Further, the metallic material may include iron, aluminum, copper and various alloys. These can be used singly or in combination of two or more.

In the present invention, the contacting components mean goods in which at least two components always or intermittently come in contact with each other and the contact area of the both components slightly move mutually or collide when the external force such as vibration, torsion and shock was added to the goods. The contact modes may be any of face contact, line contact, point contact and the like and may be adhered partially.

Figure 3:
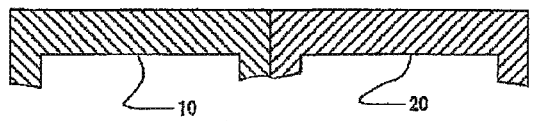
FIG. 3 is a diagrammatic illustration showing a contacting embodiment.

Specifically, there may be exemplified the goods as shown by FIG. 3, in which one surface of the component 10 and one surface of the component 20 are butted against each other and bonded, the goods as shown by FIGS. 4 to 8, in which a portion of the component 10 is fitted into the concave portion formed in the component 20 and contacted.

Figure 4:
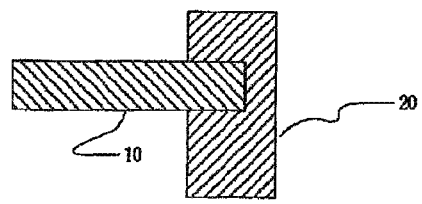
FIG. 4 is a diagrammatic illustration showing another contacting embodiment.
Figure 5:
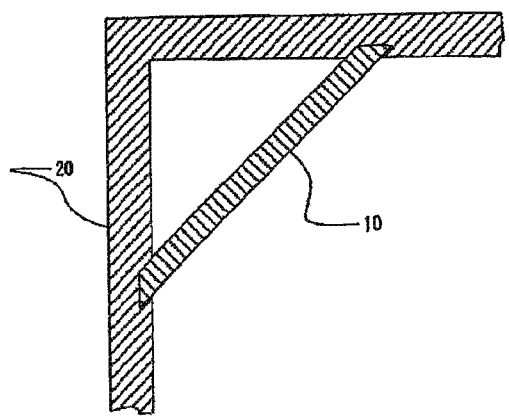
FIG. 5 is a diagrammatic illustration showing another contacting embodiment.
Figure 6:
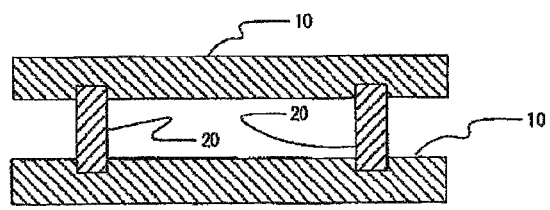
FIG. 6 is a diagrammatic illustration showing another contacting embodiment.

As examples of the goods in which the components are fitted and contacted, there may be exemplified, as shown by FIG. 4, the goods in which one end of the component 10 is fitted into the complementary concave portion formed in the component 20 and contacted, as shown by FIG. 5, the goods in which in each of the complementary concave portions formed in the corner of the component 20, each of the ends is fitted into and contacted, as shown by FIG. 6, the goods in which in each of the complementary concave portions formed in the two components 10 positioned parallel, each of the ends of the component 20 is fitted into and contacted, as shown by FIG. 7, the component 20 having the external dimension identical to the internal dimension of the component 10 is inserted into the component 10 in a nesting form to come into contact the inside surface with the outside surface of the two components closely.

Further, two components in the present invention are not always required to be fitted, as shown by FIG. 8, the goods in which those are fitted with some space and play and repeat contact or non-contact when the external force such as vibration, torsion and shock are added to the goods, are also included.

As the goods including complexly the contact portions as above-mentioned, the goods as shown by FIGS. 9(A), 9(B) and 9(C) are exemplified. In the goods of FIGS. 9(A), 9(B) and 9(C), the component 10 is the measure-like goods comprising the rectangular parallelepiped with the whole base opened and the component 20 is a molded article having the similar shape with the component 10 and having the rectangular opening formed at the center of the top. And as shown by FIGS. 9(A), 9(B) and 9(C), the component 20 can be fitted into the component 10 and the outer periphery surface of the component 20 and the inner periphery surface of the component 10 come into contact with each other and when they received the external force like vibration and the like, they transform slightly to repeat contact and non-contact. As shown by FIG. 10, the component 20 has protrusions 30 at the opposing outer side surfaces and as shown by FIGS. 9(A), 9(B) and 9(C), the component 10 has holes for receiving the protrusions 30 of the component 20 at the opposing two side surfaces. When the component 10 is fitted into the component 20, the protrusions 30 were snap fitted into the holes to prevent the both components from separating easily. By molding at least one component among the component 10 and the component 20 from the thermoplastic resin composition of the present invention, for example, even when the external force is applied in the direction of the arrow shown in FIG. 9 (C), the generation of squeaking noises can be prevented. Meanwhile, the direction of the external force is not limited to the direction shown by FIG. 9 (C), even when the external force is applied from other directions, the generation of squeaking noises are prevented if at least one of the component 10 and the component 20 is molded from the thermoplastic resin composition of the present invention. Further, it is also possible to change the sectional shape of the protrusions 30 and the shape of the holes to change to press fitting.

FIG. 11 shows the similar embodiment as in FIGS. 9(A), 9(B) and 9(C) except that the inside surface and the outside surface of the component 10 and the component 20 are bonded using an adhesive 31, instead of snap fitting of the protrusions 30 and the holes provided at the component 10 and the component 20. Further, the component 10 and the component 20 can be welded by laser welding and the like in place of the adhesive 31. This method is favorable when the both components are made from the thermoplastic resin composition. Especially, it is preferred to combine the component which is made from the transparent thermoplastic resin transmitting a laser beam with the component which is made from the thermoplastic resin absorbing a laser beam. As the specific goods, measuring instruments such as an in-vehicle speedometer, lighting, etc. may be exemplified.

Figures 12A, 12B:
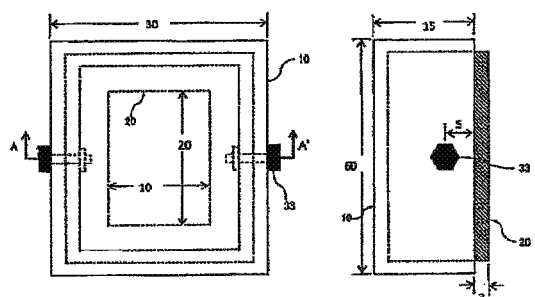
FIGS. 12(A), 12(B) and 12(C) are diagrammatic illustrations showing another contacting embodiment.
Figure 12:
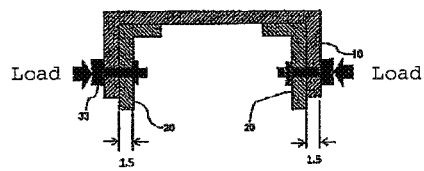
Figure 13:
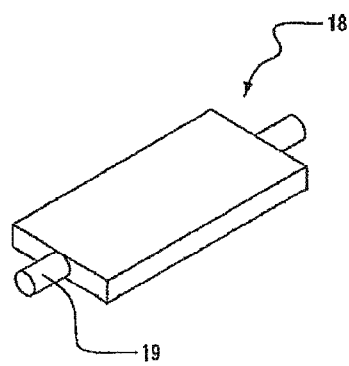
FIG. 13 is a diagrammatic illustration showing another contacting embodiment.

FIG. 12 shows the similar embodiment as in FIGS. 9(A), 9(B) and 9(C), except that holes are provided at the opposing side surfaces of the component 10 and the component 20 and the both components are secured with a bolt and a nut through these two holes. Instead of the bolt and nut, screws, pins, rivets, bushes, brackets, hinges, nails, etc. may be used to secure the component 10 and the component 20.

Figures 14A, 14B:
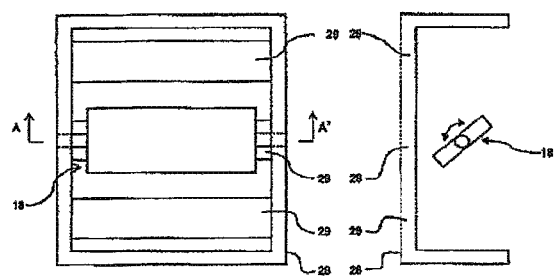
FIGS. 14(A), 14(B) and 14(C) are diagrammatic illustrations showing another contacting embodiment.
Figure 14C:

Further, it is preferred to form the goods as shown by FIGS. 14(A), 14(B) and 14(C) from the thermoplastic resin composition, which comprises the component 18 consisting of the rectangular plate-like main body, the columnar axis 19 projected in a longitudinal and outside direction from the both ends of the main body, and the frame-like component 28 supporting the component 18 pivotable around the axis 19 by insertion of the axis 19 of the component 18. By forming at least one of the component 18 and the component 28 from the thermoplastic resin composition of the present invention, the generation of squeaking noises can be suppressed when the component 18 is rotated about the axis 19 or when vibration is added to the goods.

As shown by FIGS. 14(A), 14(B) and 14(C), the goods in which the frame-like component 28 is provided with a plurality of openings 29 are used as equipments which adjust the quantity and the direction of flowing air with the angle of the component 18. These equipments may include domestic and in-vehicle air conditioners, diffusers for air cleaners, blowers, etc.

In the above-mentioned goods, when at least one of the components 10, 18 and the components 20, 28 is molded from the thermoplastic resin composition of the present invention, the generation of squeaking noises can be reduced remarkably. Other components may be molded articles of the thermoplastic resin composition.

As the examples of the above-mentioned contacting components and the structure including the contacting components, for example, electric or electronic appliances, optical appliances, lighting appliances, business appliances or household electric appliances, automobile interior appliances, household interior appliances, and the like may be included.

The contacting component of the electric or electronic appliances may include housings of cameras such as a digital video camera and a still camera, housings of a hand-held computer, a mobile telephone, a mobile information terminal, and the like.

The contacting component of the lighting appliances may include a panel, a cover, a connector, etc. of a ceiling light.

The contacting component of the business appliances may include exterior components such as a case and a housing, interior components, components around a switch, components of a movable portion, components of a desk lock, a desk drawer, a paper tray of a copy machine, and the like.

The contacting component of the household electrical appliances may include exterior components such as a case and a housing, interior components, components around a switch, components of a movable portion, and the like.

The contacting component of the automobile interior appliances may include a door trim, a door lining, a pillar garnish, a console, a console box, a center panel, a door pocket, a ventilator, a duct, an air-conditioner, a meter visor, an instrument panel upper garnish, an instrument panel lower garnish, an A/T indicator, on-off switches (a slide part, a slide plate), a switch bezel, a grill front defroster, a grill side defroster, a lid cluster, a cover instrument lower, masks (e.g., a mask switch and a mask radio), a glove box, pockets (a pocket deck, a pocket card etc.), a steering wheel horn pad, a switch part and exterior parts for car navigation.

The contacting component of the housing interior appliances may include a shelf door, a chair damper, a folding leg movable part of a table, a door open-close damper, a sliding door rail, a curtain rail, and the like.

EXAMPLES

Hereinafter, the present invention will be described more specifically by way of examples, however, the present invention is not limited to the examples as set forth below. In the examples and comparative examples, part and % are on a mass basis, unless otherwise stated. The amount of the ingredient (A), the ingredient (B) and the ingredient (C) is respectively based on 100% of the total amount of the ingredient (A), the ingredient (B) and the ingredient (C), and the amount of the ingredient (D) and the amount of the structural unit derived from α,β-unsaturated glycidyl ester compound are based on 100% of the total amount of the ingredient (A), the ingredient (B) and the ingredient (C).

(1) Evaluation Methods:

(1-1) Squeaking Noise Evaluation I (Noise Risk Values)

Using an injection molding machine "IS-170FA" (trade name) manufactured by Toshiba Machine Co., Ltd., the thermoplastic resin compositions as shown in Table 1 were injection-molded under the conditions of a cylinder temperature of 240° C., an injection pressure of 80 MPa and a mold temperature of 60° C., to obtain the injection-molded plates having a length of 150 mm, a width of 100 mm and a thickness of 4 mm. From the above-mentioned injection-molded plate, the specimens having a length of 60 mm, a width of 100 mm and a thickness of 4 mm and a length of 50 mm, a width of 25 mm and a thickness of 4 mm were cut out by a discsaw, respectively. Next, after the end portions were beveled with a sandpaper of a count #100, fine burrs were removed by a cutter knife to thus obtain two plates of a large size and a small size as specimens for evaluation of the squeaking noises. As the material of the different kind, polymethyl methacrylate (methacrylic resin "ACRYPET VH 001" manufactured by MITUBISHI RAYON CO., LTD.) was used.

The two specimens were heat aged (aging) for 300 hours in an oven adjusted to 75° C.±5° C., then cooled at 25° C. for 24 hours. The large size specimen and the small size specimen were fixed to a stick-slip measuring instrument "SSP-02" manufactured by Ziegler-Instrument GmbH, and the squeaking noises were evaluated from noise risk values obtained by rubbing against each other at an amplitude of vibration of 20 mm three times under the conditions of loads 5N and 40N, and speeds 1 mm/sec and 10 mm/sec shown in Table 1 and at a temperature of 23° C. and a humidity of 50% R.H. As the noise risk value becomes large, squeaking noises tend to be generated. Meanwhile, since in this test the evaluation is made after heat aging, the maintenance of the squeaking noises reduction effect can be also evaluated.

The evaluation of the squeaking noises in the case of using the material of the different kind was carried out by rubbing the large size specimen made from the thermoplastic resin composition shown in Table 1 against the small size specimen made from PMMA to evaluate the noise risk values.

(1-2) Squeaking Noise Evaluation II (Practical Use Evaluation):

(In the Case of the Same Materials)

Using an injection molding machine "J-100E" (model name) manufactured by The Japan Steel Works, Ltd., ten ISO dumbbell specimens made from the thermoplastic resin compositions in Table 1 were injection-molded, respectively and these specimens were left at rest in a gear oven at 80° C. for 400 hours. Next, ten ISO dumbbell specimens as the contacting components which were left at rest in a gear oven were stacked one on another to form structures, and both ends thereof were twisted by hand, thereby evaluating a condition of squeaking noise generation. The evaluation was carried out five times and judgment was done on the basis of the following evaluation criteria.

(In the Case of the Different Materials)

Using an injection molding machine "J-100E" (model name) manufactured by The Japan Steel Works, Ltd., five ISO dumbbell specimens made from the thermoplastic resin compositions in Table 1 and PMMA were injection-molded, respectively and these specimens were left at rest in a gear oven at 80° C. for 400 hours. Next, five ISO dumbbell specimens made from each of thermoplastic resin compositions as the contacting components and five ISO dumbbell specimens made from PMMA, which were left at rest in a gear oven were stacked one on another to form structures, and both ends thereof were twisted by hand, thereby evaluating a condition of squeaking noise generation. The evaluation was carried out five times and judgment was done on the basis of the following evaluation criteria. As the PMMA, the methacrylic resin "ACRYPET VH001" manufactured by MITSUBISHI RAYON CO., LTD. was used.

Evaluation Criteria:

◯: In all of the five evaluations, there was only slight generation of squeaking noises.

×: In one or more of the five evaluations, there was remarkable generation of squeaking noises.

(1-3) Surface Gloss

Using an injection molding machine "ELJECT NEX 30" (model name) manufactured by Nissei Plastic Industrial Co., Ltd., plate-like specimens having a length of 80 mm, a width of 55 mm and a thickness of 2.4 mm were injection-molded. The molding conditions were: a side gate with 4 mm×1 mm in the center of one side of 55 mm, the resin temperature at the time of molding 240° C., the mold temperature 50° C. and the injection speed 30 mm/sec. The gloss of the surface of the obtained specimens was measured by use of a digital glossimeter "GM-26D" (model name) manufactured by MURAKAMI COLOR RESEARCH LABORATORY in accordance with JIS K 7105. The angle of measurement was 60°.

(1-4) Charpy Impact Strength

The charpy impact strength (Edgewise impact, with a notch) at room temperature was measured in accordance with ISO 179. The unit is KJ/m$^2$. The measurement conditions were as follows:

Specimen type: Type 1

Notch type: Type A

Load: 2 J (2) Raw Materials
(2-1) Rubber-Reinforced Aromatic Vinyl Resin (P): Ingredients (A) (A1), Ingredients (B) (B1)
P1-1: AES-1

A stainless steel autoclave having a volume of 20 liters equipped with a ribbon type stirrer vane, a continuous aid feeder, a thermometer, etc. was charged with 22 parts of an ethylene-propylene copolymer (ethylene/propylene=78/22 (%), Mooney viscosity ($ML_{1+4}$, 100° C.) of 20, melting point (Tm) of 40° C., glass transition temperature (Tg) of −50° C.) as an ethylene-α-olefin rubber polymer (a), 55 parts of styrene, 23 parts of acrylonitrile, 0.5 part of t-dodecyl mercaptan, and 110 parts of toluene, then the internal temperature was raised to 75° C., and then the content in the autoclave was stirred for 1 hour to form a homogeneous solution. Then, 0.45 part of t-butyl peroxyisopropyl monocarbonate was added and the inner temperature was further raised. After the inner temperature reached 100° C., a polymerization reaction was carried out at a stirring rotation speed of 100 rpm while maintaining that temperature. At a time of four hours after the start of the polymerization reaction, the internal temperature was raised to 120° C., and a reaction was further carried out for 2 hours while maintaining that temperature, so that the polymerization reaction was finished. The polymerization conversion was 98%. Then, the internal temperature was cooled to 100° C., and 0.2 part of octadecyl-3-(3,5-di-t-butyl-4-hydroxyphenol) propionate and 0.02 part of dimethyl silicone oil; KF-96-100 cSt (trade name: manufactured by Shin-Etsu Silicones) were added. Then, the reaction mixture was taken out from the autoclave, an unreacted substance and a solvent were distilled off therefrom by steam distillation, and moreover volatile components were removed substantially completely by using a 40 mm φ extruder having a vent (cylinder temperature: 220° C., degree of vacuum: 760 mmHg), thereby forming pellets. In the resulting ethylene-α-olefin rubber-reinforced vinyl resin, the amount of the ethylene-α-olefin rubber polymer (a) was 22% (calculated from the degree of conversion), the graft ratio was 70% and the intrinsic viscosity [η] of its acetone-soluble fraction was 0.47 dl/g.

(2-2) Rubber-Reinforced Aromatic Vinyl Resin (P): Ingredients (A) (A2), Ingredients (B) (B2)
P2-1: ABS-1

A polymerization vessel equipped with a stirrer was charged with 280 parts of water, 60 parts (in terms of solid) of polybutadiene latex having a weight average particle diameter of 0.26 μm and a gel fraction of 90% as a diene rubber polymer, 0.3 part of sodium formaldehyde sulfoxylate, 0.0025 part of ferrous sulfate, and 0.01 part of disodium ethylenediaminetetraacetate, followed by deoxygenation. After heating to 60° C. under stirring under a nitrogen flow, a monomer mixture composed of 10 parts of acrylonitrile, 30 parts of styrene, 0.2 part of t-dodecyl mercaptan, and 0.3 part of cumene hydroperoxide was dropped at 60° C. continuously over 5 hours. After completion of the dropping, the polymerization temperature was raised to 65° C., and the polymerization was completed after continuing stirring for 1 hour, so that a latex of a graft copolymer was obtained. The polymerization conversion was 98%. Then, the resulting latex was coagulated by adding 0.2 part of 2,2'-methylene-bis(4-ethylene-6-t-butylphenol) and calcium chloride thereto, and a resin composition in a powder form was obtained after washing, filtration, and drying steps. The amount of the diene rubber polymer of the obtained resin composition was 60%, the graft ratio was 40% and the intrinsic viscosity [η] of the acetone-soluble fraction was 0.38 dl/g.

P2-2: ABS-2 (GMA Modified ABS)

A polymerization vessel equipped with a stirrer was charged with 280 parts of water, 70 parts (in terms of solid) of polybutadiene latex having a weight average particle diameter of 0.26 μm and a gel fraction of 90% as a diene rubber polymer, 0.3 part of sodium formaldehyde sulfoxylate, 0.0025 part of ferrous sulfate, and 0.01 part of disodium ethylenediaminetetraacetate, followed by deoxygenation. After heating to 60° C. under stirring under a nitrogen flow, a monomer mixture composed of 7 parts of acrylonitrile, 20 parts of styrene, 3 parts of glycidyl methacrylate (GMA), 0.2 part of t-dodecyl mercaptan, and 0.3 part of cumene hydroperoxide was dropped at 60° C. continuously over 5 hours. After completion of the dropping, the polymerization temperature was raised to 65° C., and the polymerization was completed after continuing stirring for 1 hour, so that a latex of a graft copolymer was obtained. The polymerization conversion was 98%. Then, the resulting latex was coagulated by adding 0.2 part of 2,2'-methylene-bis (4-ethylene-6-t-butylphenol) and calcium chloride thereto, and a resin composition in a powder form was obtained after washing, filtration, and drying steps. The amount of the diene rubber polymer of the obtained resin composition was 70%, the graft ratio was 35% and the intrinsic viscosity [η] of the acetone-soluble fraction was 0.45 dl/g.

(2-2) Vinyl Non-Graft Polymer: Ingredient (B) (B3)
Q-1: AS-1

A polymerization vessel equipped with a stirrer was charged with 250 parts of water and 1.0 part of sodium palmitate. Following deoxygenation, the mixture was heated to 70° C. under stirring under a nitrogen flow. Furthermore, 0.4 part of sodium formaldehyde sulfoxylate, 0.0025 part of ferrous sulfate, and 0.01 part of disodium ethylenediaminetetraacetate were charged, and then 100 parts of a monomer mixture composed of 70 parts of α-methylstyrene (70% of the monomer mixture), 26 parts of acrylonitrile (26% of same) and 4 parts of styrene (4% of same), and 0.45 part of tert-dodecyl mercaptan were mixed and dropped continuously over 7 hours at a polymerization temperature of 70° C. After completion of the dropping, the polymerization temperature was raised to 75° C., and the polymerization was completed by continuing stirring for 1 hour, so that a latex of a copolymer was obtained. Then, the resulting latex was coagulated by adding calcium chloride, and a copolymer in a powder form was obtained after washing, filtration, and drying steps. The polymerization conversion was 98%, the intrinsic viscosity [η] (measured at 30° C. in methyl ethyl ketone) was 0.40 dl/g, and the glass transition temperature (Tg) was 140° C.

Q-2: AS-2

A synthetic apparatus obtained by connecting two jacketed polymerization reactors, each having an inside volume of 30 liters equipped with a ribbon type stirrer vane was used.

Each reactor was purged with nitrogen gas and the first reactor was charged continuously with a mixture of 75 parts of styrene, 25 parts of acrylonitrile and 20 parts of toluene, a solution dissolving 0.12 part of tert-dodecyl mercaptan as a molecular weight modifier and 5 parts of toluene, and a solution dissolving 0.1 part of 1,1'-azobis (cyclohexane-1-carbonitrile) as a polymerization initiator in 5 parts of toluene. The polymerization temperature of the first reactor was controlled at 110° C., the average retention time was 2 hours and the polymerization conversion was 57%.

The obtained polymer solution was taken out continuously by a pump located at an exterior of the first reactor in the same amount as the charged amount of styrene, acrylonitrile, toluene, the molecular weight modifier and the polymerization initiator and fed to the second reactor. In the second reactor, the polymerization temperature was 130° C. and the polymerization conversion was 57%.

The polymer solution obtained from the second reactor was introduced into a three vent-type twin-screw extruder and unreacted monomers and the solvent were removed directly and pelletized. The intrinsic viscosity [η] was 0.48 dl/g.

Q-3: AS-3 (GMA Modified AS)

A polymerization vessel equipped with a stirrer was charged with 250 parts of water and 1.0 part of sodium palmitate. Following deoxygenation, the mixture was heated to 70° C. under stirring under a nitrogen flow. Furthermore, 0.4 part of sodium formaldehyde sulfoxylate, 0.0025 part of ferrous sulfate, and 0.01 part of disodium ethylenediaminetetraacetate were charged, and then 100 parts of a monomer mixture composed of 70 parts of styrene, 27 parts of acrylonitrile and 3 parts of glycidyl methacrylate (GMA) and 0.2 part of tert-dodecyl mercaptan were mixed and then dropped continuously over 7 hours at a polymerization temperature of 70° C. After completion of the dropping, the polymerization temperature was raised to 75° C., and the polymerization was completed by continuing stirring for 1 hour, so that a latex of a copolymer was obtained. Then, the resulting latex was coagulated by adding calcium chloride, and a copolymer in a powder form was obtained after washing, filtration, and drying steps. The polymerization conversion was 98%, and the intrinsic viscosity [η] (measured at 30° C. in methyl ethyl ketone) was 0.45 dl/g.

(2-3) Matting Agent: Ingredient (C)

R-1 (organic matting agent: irregular shape: diene rubber modified copolymer resin): the matting agent "RIVETAL MATACE AM-808" (trade name) manufactured by ZEON KASEI Co., Ltd was used. When the resin composition containing R-1 was observed by a transmission electron microscope, R-1 was present as amebic irregular-shaped particles.

R-2 (organic matting agent: (crosslinked) rubber polymer): METABLEN F410" (trade name) manufactured by MITSUBISHI RAYON CO., LTD was used. F-410 is a crosslinked methyl methacrylate-alkyl acrylate-styrene copolymer.

R-3 (inorganic matting agent: microglass chopped strand "RES03-TP98Z" (trade name) manufactured by NSG Vetrotex was used. The diameter of glass fibers was 13 μm.

R-4 (inorganic matting agent: powdery, particulate): MICROGLAS FLEKA "REFG 101" (trade name) manufactured by Nippon Sheet Glass Company, Ltd. was used. The average thickness of base glass was 5 μm and the average particle diameter was 600 μm.

R-5 (inorganic matting agent: powdery, particulate): fine powdered talc "MICRO ACE P-3" (trade name) manufactured by NIPPON TALC CO., LTD. was used. The average particle diameter $D_{50}$ measured by a laser diffraction method was 5 μm.

R-6 (organic matting agent: (crosslinked) rubber polymer): matting and light diffusion improver of acrylic rubber type "KANE ACE MP-90" (trade name) was used.

(2-4) Polycarbonate Resin: Ingredient (D)

S-1: Polycarbonate resin "NOVAREX 7022 PJ-LH1" manufactured by Mitubishi Engineering-Plastics Corporation was used.

Examples 1-18 and Comparative Examples 1-2

The thermoplastic resin compositions comprising the above-described components (A), (B), (C) or further (D) were mixed in the incorporation ratios shown in Tables 1 to 3 by using a Henschel mixer, and then were kneaded in a twin screw extruder (manufactured by The Japan Steel Works, Ltd., TEX44α, barrel preset temperature 250° C.), so that thermoplastic resin compositions were pelletized.

Using the obtained pellets specimens for evaluation as described above were molded. Using the specimens obtained, evaluations were carried out by the methods described above. The results of the evaluations are shown in Tables 1 to 3.

TABLE 1

| Thermoplastic resin compositions and properties | | | | | | Examples | | | | | |
|---|---|---|---|---|---|---|---|---|---|---|---|
| | | Rubber amount (%) | Graft ratio (%) | 1 | 2 | 3 | 4 | 5 | 6 | 7 | 8 |
| Materials (%) | P1-1: AES-1 | 22 | 70 | 35 | 22 | 22 | 35 | 35 | 35 | 35 | 35 |
| | P2-1: ABS-1 | 60 | 40 | | 25 | 25 | | | | | |
| | P2-2: ABS-2 | 70 | 35 | | | | | | | | |
| | Q-1: AS-1 | | | 40 | 40 | 40 | 40 | 40 | 40 | 40 | 40 |
| | Q-2: AS-2 | | | 20 | 10 | 8 | 23 | 20 | 20 | 15 | 23 |
| | Q-3: AS-3 | | | | | | | | | | |
| | R-1: AM-808 | | | 5 | 3 | 5 | | | | | |
| | R-2: METABLEN F-410 | | | | | | 2 | | | | |
| | R-3: RES03-TP89Z | | | | | | | 5 | | | |
| | R-4: REFG101 | | | | | | | | 5 | | |
| | R-5: MICRO ACE P-3 | | | | | | | | | 10 | |
| | R6: KANE ACE MP-90 | | | | | | | | | | 2 |
| | S-1: NOVAREX 7022PJ-LH1 | | | | | | | | | | |
| | Total (%) | | | 100 | 100 | 100 | 100 | 100 | 100 | 100 | 100 |
| Vinyl graft polymer (A) (%) | Vinyl graft polymer in P1-1 (Rubber: a1 ethylene-α-olefin) | | | 13.1 | 8.2 | 8.2 | 13.1 | 13.1 | 13.1 | 13.1 | 13.1 |
| | Vinyl graft polymer in P2-1 (Rubber: a2 diene) | | | | 21.0 | 21.0 | | | | | |
| | Vinyl graft polymer in P2-2 (Rubber: a2 diene) | | | | | | | | | | |

TABLE 1-continued

Thermoplastic resin compositions and properties

| | | Rubber amount (%) | Graft ratio (%) | Examples 1 | 2 | 3 | 4 | 5 | 6 | 7 | 8 |
|---|---|---|---|---|---|---|---|---|---|---|---|
| Vinyl non-graft polymer (B) (%) | Free AS (B1) in P1-1 | | | 21.9 | 13.8 | 13.3 | 21.9 | 21.9 | 21.9 | 21.9 | 21.9 |
| | Free AS (B2) in P2-1 | | | | 4.0 | 4.0 | | | | | |
| | Free AS (B2) in P2-2 | | | | | | | | | | |
| | AS-1 (B3) of Q-1 | | | 40.0 | 40.0 | 40.0 | 40.0 | 40.0 | 40.0 | 40.0 | 40.0 |
| | AS-2 (B3) of Q-2 | | | 20.0 | 10.0 | 8.0 | 23.0 | 20.0 | 20.0 | 15.0 | 23.0 |
| | AS-3 (B3) of Q-3 | | | | | | | | | | |
| Matting agent (C) (%) | R-1: AM-808 | | | 5.0 | 3.0 | 5.0 | | | | | |
| | R-2: METABLEN F-410 | | | | | | 2.0 | | | | |
| | R-3: RES03-TP89Z | | | | | | | 5.0 | | | |
| | R-4: REFG101 | | | | | | | | 5.0 | | |
| | R-5: MICRO ACE P-3 | | | | | | | | | 10.0 | |
| | R6: KANE ACE MP-90 | | | | | | | | | | 2.0 |
| Polycarbonate resin (D) (%) | S-1: PC | | | | | | | | | | |
| Construction of rubber | a1: ethylene-α-olefin rubber | | | 100 | 24 | 24 | 100 | 100 | 100 | 100 | 100 |
| | a2: diene rubber | | | 0 | 76 | 76 | 0 | 0 | 0 | 0 | 0 |
| Structural unit derived from GMA (%) | | | | | | | | | | | |
| Melting point of thermoplastic resin composition (° C.) | | | | 40 | 40 | 40 | 40 | 40 | 40 | 40 | 40 |
| Surface gloss (60°) | | | | 43 | 53 | 43 | 45 | 55 | 58 | 50 | 57 |
| Charpy impact strength (KJ/m$^2$) | | | | 7 | 18 | 19 | 7 | 5 | 6 | 6 | 7 |
| Evaluation of squeaking noises I | Noise resk values (after aging) (same materials) | 5N, 1 mm/sec | | 1 | 1 | 1 | 1 | 1 | 1 | 1 | 1 |
| | | 5N, 10 mm/sec | | 1 | 2 | 1 | 1 | 1 | 1 | 1 | 1 |
| | | 40N, 1 mm/sec | | 1 | 1 | 1 | 1 | 1 | 1 | 1 | 1 |
| | | 40N, 10 mm/sec | | 1 | 2 | 2 | 1 | 1 | 1 | 1 | 1 |
| Evaluation of squeaking noises II | Practical use evaluation (same materials) | 80° C. × 400 hours | | ○ | ○ | ○ | ○ | ○ | ○ | ○ | ○ |
| Evaluation of squeaking noises I | Noise risk values (after aging) (different material: PMMA) | 5N, 1 mm/sec | | 1 | 1 | 1 | 1 | 1 | 1 | 1 | 1 |
| | | 5N, 10 mm/sec | | 1 | 2 | 1 | 1 | 1 | 1 | 1 | 1 |
| | | 40N, 1 mm/sec | | 1 | 1 | 1 | 1 | 1 | 1 | 1 | 1 |
| | | 40N, 10 mm/sec | | 1 | 2 | 2 | 1 | 1 | 1 | 1 | 1 |
| Evaluation of squeaking noises II | Practical use evaluation (different material: PMMA) | 80° C. × 400 hours | | ○ | ○ | ○ | ○ | ○ | ○ | ○ | ○ |

TABLE 2

Thermoplastic resin compositions and properties

| | | Rubber amount (%) | Graft ratio (%) | Examples 9 | 10 | 11 | 12 | 13 | 14 |
|---|---|---|---|---|---|---|---|---|---|
| Materials (%) | P1-1: AES-1 | 22 | 70 | 22 | 22 | 35 | 22 | 22 | 22 |
| | P2-1: ABS-1 | 60 | 40 | | | | | | |
| | P2-2: ABS-2 | 70 | 35 | 15 | 15 | 15 | | | 15 |
| | Q-1: AS-1 | | | 28 | 28 | 28 | 40 | 40 | 28 |
| | Q-2: AS-2 | | | 33 | 30 | 20 | 34 | 26 | 30 |
| | Q-3: AS-3 | | | | | | 2 | 10 | 3 |
| | R-1: AM-808 | | | 2 | 5 | 2 | 2 | 2 | 2 |
| | R-2: METABLEN F-410 | | | | | | | | |
| | R-3: RES03-TP89Z | | | | | | | | |
| | R-4: REFG101 | | | | | | | | |
| | R-5: MICRO ACE P-3 | | | | | | | | |
| | R-6: KANE ACE MP-90 | | | | | | | | |
| | S-1: NOVAREX 7022PJ-LH1 | | | | | | | | |
| | Total (%) | | | 100 | 100 | 100 | 100 | 100 | 100 |
| Vinyl graft polymer (A) (%) | Vinyl graft polymer in P1-1 (Rubber: a1 ethylene-α-olefin) | | | 8.2 | 8.2 | 13.1 | 8.2 | 8.2 | 8.2 |
| | Vinyl graft polymer in P2-1 (Rubber: a2 diene) | | | | | | | | |
| | Vinyl graft polymer in P2-2 (Rubber: a2 diene) | | | 14.2 | 14.2 | 14.2 | | | 14.2 |

TABLE 2-continued

Thermoplastic resin compositions and properties

| | | Rubber amount (%) | Graft ratio (%) | Examples 9 | 10 | 11 | 12 | 13 | 14 |
|---|---|---|---|---|---|---|---|---|---|
| Vinyl non-graft Polymer (B) (%) | Free AS (B1) in P1-1 | | | 13.8 | 13.8 | 21.9 | 13.8 | 13.8 | 13.8 |
| | Free AS (B2) in P2-1 | | | | | | | | |
| | Free AS (B2) in P2-2 | | | 0.8 | 0.8 | 0.8 | | | 0.8 |
| | AS-1 (B3) of Q-1 | | | 28.0 | 28.0 | 28.0 | 40.0 | 40.0 | 28.0 |
| | AS-2 (B3) of Q-2 | | | 33.0 | 30.0 | 20.0 | 34.0 | 26.0 | 30.0 |
| | AS-3 (B3) of Q-3 | | | | | | 2.0 | 10.0 | 3.0 |
| Matting agent (C) (%) | R-1: AM-808 | | | 2.0 | 5.0 | 2.0 | 2.0 | 2.0 | 2.0 |
| | R-2: METABLEN F-410 | | | | | | | | |
| | R-3: RES03-TP89Z | | | | | | | | |
| | R-4: REFG101 | | | | | | | | |
| | R-5: MICRO ACE P-3 | | | | | | | | |
| | R-6: KANE ACE MP-90 | | | | | | | | |
| Polycarbonate resin (D) (%) | S-1: PC | | | | | | | | |
| Construction of rubber | a1: ethylene-α-olefin rubber | | | 32 | 32 | 42 | 100 | 100 | 32 |
| | a2: diene rubber | | | 68 | 68 | 58 | 0 | 0 | 68 |
| Structural unit derived from GMA (%) | | | | 0.45 | 0.45 | 0.45 | 0.06 | 0.30 | 0.54 |
| Melting point of thermoplastic resin composition (° C.) | | | | 40 | 40 | 40 | 40 | 40 | 40 |
| Surface gloss (60°) | | | | 30 | 22 | 31 | 28 | 20 | 18 |
| Charpy impact strength (KJ/m²) | | | | 11 | 9 | 12 | 8 | 7 | 10 |
| Evaluation of squeaking noises I | Noise resk values (after aging) (same materials) | 5N, 1 mm/sec | | 1 | 1 | 1 | 1 | 1 | 1 |
| | | 5N, 10 mm/sec | | 1 | 1 | 1 | 1 | 1 | 1 |
| | | 40N, 1 mm/sec | | 1 | 1 | 1 | 1 | 1 | 1 |
| | | 40N, 10 mm/sec | | 1 | 1 | 1 | 1 | 1 | 1 |
| Evaluation of squeaking noises II | Practical use evaluation (same materials) | 80° C. × 400 hours | | ○ | ○ | ○ | ○ | ○ | ○ |
| Evaluation of squeaking noises I | Noise risk values (after aging) (different material: PMMA) | 5N, 1 mm/sec | | 1 | 1 | 1 | 1 | 1 | 1 |
| | | 5N, 10 mm/sec | | 1 | 1 | 1 | 1 | 1 | 1 |
| | | 40N, 1 mm/sec | | 1 | 1 | 1 | 1 | 1 | 1 |
| | | 40N, 10 mm/sec | | 1 | 1 | 1 | 1 | 1 | 1 |
| Evaluation of squeaking noises II | Practical use evaluation different material: PMMA) | 80° C. × 400 hours | | ○ | ○ | ○ | ○ | ○ | ○ |

TABLE 3

Thermoplastic resin compositions and properties

| | | Rubber amount (%) | Graft ratio (%) | Examples 15 | 16 | 17 | 18 | Comparative Examples 1 | 2 |
|---|---|---|---|---|---|---|---|---|---|
| Materials (%) | P1-1: AES-1 | 22 | 70 | 22 | 35 | 25 | 25 | | 35 |
| | P2-1: ABS-1 | 60 | 40 | 25 | | | 15 | 25 | |
| | P2-2: ABS-2 | 70 | 35 | | | 18 | | | |
| | Q-1: AS-1 | | | | | | | 40 | 40 |
| | Q-2: AS-2 | | | | | | | 30 | 25 |
| | Q-3: AS-3 | | | | | | 2 | | |
| | R-1: AM-808 | | | 5 | 5 | 2 | 3 | 5 | |
| | R-2: METABLEN F-410 | | | | | | | | |
| | R-3: RES03-TP89Z | | | | | | | | |
| | R-4: REFG101 | | | | | | | | |
| | R-5: MICRO ACE P-3 | | | | | | | | |
| | R-6: KANE ACE MP-90 | | | | | | | | |
| | S-1: NOVAREX 7022PJ-LH1 | | | 48 | 60 | 55 | 55 | | |
| | Total (%) | | | 100 | 100 | 100 | 100 | 100 | 100 |
| Vinyl graft polymer (A) (%) | Vinyl graft polymer in P1-1 (Rubber: a1 ethylene-α-olefin) | | | 15.8 | 32.7 | 20.8 | 20.8 | | 13.1 |
| | Vinyl graft polymer in P2-1 (Rubber: a2 diene) | | | 40.4 | | | 28.0 | 21.0 | |
| | Vinyl graft polymer in P2-2 (Rubber: a2 diene) | | | | | 37.8 | | | |

TABLE 3-continued

| Thermoplastic resin compositions and properties | | Rubber amount (%) | Graft ratio (%) | Examples | | | | Comparative Examples | |
|---|---|---|---|---|---|---|---|---|---|
| | | | | 15 | 16 | 17 | 18 | 1 | 2 |
| Vinyl non-graft Polymer (B) (%) | Free AS (B1) in P1-1 | | | 26.5 | 54.8 | 34.8 | 34.8 | | 21.9 |
| | Free AS (B2) in P2-1 | | | 7.7 | | | 5.3 | 4.0 | |
| | Free AS (B2) in P2-2 | | | | | 2.2 | | | |
| | AS-1 (B3) of Q-1 | | | | | | | 40.0 | 40.0 |
| | AS-2 (B3) of Q-2 | | | | | | | 30.0 | 25.0 |
| | AS-3 (B3) of Q-3 | | | | | | 4.4 | | |
| Matting agent (C) (%) | R-1: AM-808 | | | 9.6 | 12.5 | 4.4 | 6.7 | 5.0 | |
| | R-2: METABLEN F-410 | | | | | | | | |
| | R-3: RES03-TP89Z | | | | | | | | |
| | R-4: REFG101 | | | | | | | | |
| | R-5: MICRO ACE P-3 | | | | | | | | |
| | R-6: KANE ACE MP-90 | | | | | | | | |
| Polycarbonate resin (D) (%) | S-1: PC | | | 92.3 | 150.0 | 122.2 | 122.2 | | |
| Construction of rubber | a1: ethylene-α-olefin rubber | | | 24 | 100 | 30 | 38 | 0 | 100 |
| | a2: diene rubber | | | 76 | 0 | 70 | 62 | 100 | 0 |
| Structural unit derived from GMA (%) | | | | | | 1.20 | 0.13 | | |
| Melting point of thermoplastic resin composition (° C.) | | | | 40 | 40 | 40 | 40 | absent | 40 |
| Surface gloss (60°) | | | | 59 | 40 | 25 | 23 | 46 | 85 |
| Charpy impact strength (KJ/m$^2$) | | | | 38 | 35 | 40 | 50 | 22 | 7 |
| Evaluation of squeaking noises I | Noise resk values (after aging) (same materials) | 5N, 1 mm/sec | | 1 | 1 | 1 | 1 | 10 | 1 |
| | | 5N, 10 mm/sec | | 1 | 1 | 1 | 1 | 10 | 2 |
| | | 40N, 1 mm/sec | | 1 | 1 | 1 | 1 | 10 | 1 |
| | | 40N, 10 mm/sec | | 2 | 1 | 1 | 1 | 10 | 3 |
| Evaluation of squeaking noises II | Practical use evaluation (same materials) | 80° C. × 400 hours | | ○ | ○ | ○ | ○ | X | ○ |
| Evaluation of squeaking noises I | Noise risk values (after aging) (different material: PMMA) | 5N, 1 mm/sec | | 1 | 1 | 1 | 1 | 10 | 1 |
| | | 5N, 10 mm/sec | | 1 | 1 | 1 | 1 | 10 | 3 |
| | | 40N, 1 mm/sec | | 1 | 1 | 1 | 1 | 10 | 1 |
| | | 40N, 10 mm/sec | | 2 | 1 | 1 | 1 | 10 | 3 |
| Evaluation of squeaking noises II | Practical use evaluation (different material: PMMA) | 80° C. × 400 hours | | ○ | ○ | ○ | ○ | X | ○ |

As shown by Examples 1 to 3 in Table 1, the contacting components comprising molded articles made from the thermoplastic resin compositions (X) which comprise the vinyl graft polymers (A), the vinyl non-graft polymers (B) and the matting agents (C), in which the above-mentioned vinyl graft polymers (A) containing the ethylene-α-olefin rubber polymers (a1), or, further the diene rubber polymers (a2), provide the contacting components which are not only reduced remarkably in squeaking noises, but also superior in matting property, regardless of the materials of the same kinds or different kinds. Moreover, when placed under high temperatures for a long time, the contacting components which are reduced in squeaking noises and superior in appearance in matting property can be provided.

Examples 4 to 8 are cases where other matting agents (C) were used, the same results as in Examples 1 to 3 are obtained.

As shown in Table 2, Examples 9 to 11 are cases where the GMA modified ABS resins were used as the vinyl graft polymer (A) and those are superior remarkably in matting property.

Examples 12 and 13 are cases where the GMA modified AS resins were used in combination as the vinyl non-graft polymer (B) and those are superior remarkably in matting property similarly to Examples 9 to 11.

Example 14 is a case where the GMA modified ABS resin was used in combination as the vinyl graft polymer (A) and the GMA modified AS resin was used in combination as the vinyl non-graft polymer (B) and the effects in matting property are more remarkable.

As shown in Table 3, Examples 15 to 18 are cases where the polycarbonate resin (D) was contained and those are superior in impact resistance.

In contrast, the contacting component comprising a molded article made from the thermoplastic resin composition of Comparative Example 1, in which the vinyl graft polymer (A) does not contain the ethylene-α-olefin rubber polymer (a1) is inferior in reduction of squeaking noises. Further, the molded article made from the thermoplastic resin composition of Comparative Example 2 in which the matting agent is not contained, is inferior in matting property Example 19

The component 10 in FIGS. 9(A), 9(B) and 9(C) was molded using the thermoplastic resin composition of Example 1 and the component 20 in FIGS. 9(A), 9(B) and 9(C) was molded using the thermoplastic resin composition of Comparative Example 1. The both components were assembled by fitting in as shown in FIGS. 9(A), 9(B) and 9(C) and a load was applied repeatedly in the direction of an arrow, but the squeaking noises were not generated. After this assembly was left in a gear over at 80° C. for 400 hours, a load was applied repeatedly in the direction of an arrow but the squeaking noises were not generated similarly.

Example 20

Figure 15A:
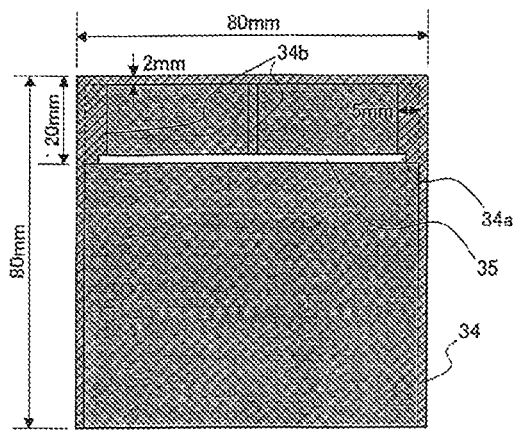
FIGS. 15(A) and 15(B) are diagrammatic illustrations showing a meter-like structure.
Figure 15B:
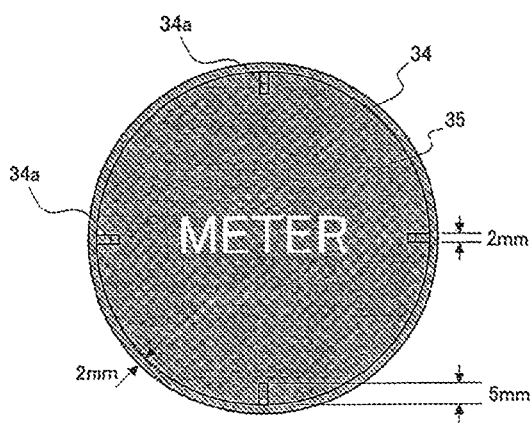

Using the thermoplastic resin composition of Example 1 to which 1 part of carbon black is added, as shown in FIG. 15, the cylindrical component 34 providing the ribs 34b with the cut portions 34a at the apex portion at the four places of the circumferential rim was molded. To the bottom surface of the component 34, the disk with white letters "METER" was bonded. Next, using the methacrylic resin "ACRYPET VH001" manufactured by MITSUBISHI RAYON CO., LTD., the disk-like component (transparent plate) 35 was molded and fitted in the cut portions 34a of the ribs 34b of the component 34 to obtain the meter-like structure. To this structure, vibration was applied but the squeaking noises at the fitted portion was not generated. Further, since the component 34 was matted, there were no reflected light and image reflection on the disk-like component (transparent plate) 35 and thus the visibility of the letter disc was excellent. This structure was left in a gear over at 80° C. for 400 hours and then vibration was added to the structure, but the squeaking noises were not generated similarly. Furthermore, the reflected light and image reflection did not occur on the disk-like component (transparent plate) 35 and the visibility of the letter disc was also excellent.

INDUSTRIAL APPLICABILITY

According to the present invention, by a molded article containing a vinyl graft polymer, a vinyl non-graft polymer and a matting agent, and the vinyl graft polymer containing an ethylene-α-olefin rubber polymer, a contacting component and a structure including the contacting component are provided which is reduced remarkably in squeaking noises that are generated when coming in contact with or rubbing against other members and superior in matting property, more specifically, even when placed under high temperatures for a long time, a contacting component and a structure including the contacting component are provided which is reduced remarkably in squeaking noises and superior in matting property.

Further, according to the present invention, a method for reducing the squeaking noises by using the above-mentioned contacting component and the structure is also provided.

DESCRIPTION OF REFERENCE SIGNS

M object
V driving speed
μs coefficient of friction of the upper end of saw wavy form (static coefficient of friction)
μl coefficient of friction of the lower end of saw wavy form
Δμ μs–μl
10, 18, 20, 28, 34, 35 components
19 axis
29 opening
30 protrusion
31 adhesive
33 bolt nut
34a cut portion
34b rib

The invention claimed is:

1. A contacting component comprising a molded article made from a thermoplastic resin composition (X) containing a vinyl graft polymer (A), a vinyl non-graft polymer (B) and a matting agent (C), wherein:
the vinyl graft polymer (A) contains an ethylene-α-olefin rubber polymer (a1).

2. The contacting component according to claim 1, wherein an amount of the vinyl graft polymer (A) is 1 to 40% by mass based on 100% by mass of the total amount of the vinyl graft polymer (A), the vinyl non-graft polymer (B) and the matting agent (C).

3. The contacting component according to claim 1, wherein a melting point (measured according to JIS K 7121-1987) of the vinyl graft polymer (A) is present in a range of from 0 to 100° C.

4. The contacting component according to claim 1, wherein the vinyl graft polymer (A) contains the ethylene-α-olefin rubber polymer (a1) having a melting point (measured according to JIS K 7121-1987) in a range of from 0 to 100° C.

5. The contacting component according to claim 1, wherein the vinyl graft polymer (A) contains further a diene rubber polymer (a2).

6. The contacting component according to claim 1, wherein the vinyl graft polymer (A) and/or the vinyl non-graft polymer (B) contain a structural unit derived from an α,β-unsaturated glycidyl ester compound and an amount of the structural unit is 0.01 to 5% by mass based on 100% by mass of the total amount of the vinyl graft polymer (A), the vinyl non-graft polymer (B) and the matting agent (C).

7. The contacting component according to claim 1, wherein an amount of the matting agent (C) is 1 to 30% by mass based on 100% by mass of the total amount of the vinyl graft polymer (A), the vinyl non-graft polymer (B) and the matting agent (C).

8. The contacting component according to claim 1, wherein the matting agent (C) is a polymer matting agent (C1).

9. The contacting component according to claim 8, wherein the matting agent (C1) is a resin composition (C2) which contains a copolymer resin (c1) of acrylonitrile and styrene or α-methylstyrene and an ingredient (c2) containing an unsaturated nitrile-conjugated diene copolymer rubber and the copolymer rubber is crosslinked.

10. The contacting component according to claim 8, wherein the polymer matting agent (C1) is selected from the group consisting of crosslinked vinyl polymers, (crosslinked) rubber polymers and copolymer resins modified with diene rubbers.

11. The contacting component according to claim 1, wherein a polycarbonate resin (D) is further contained.

12. The contacting component according to claim 11, wherein an amount of the polycarbonate resin (D) is 30 to 400% by mass based on 100% by mass of the total amount of the vinyl graft polymer (A), the vinyl non-graft polymer (B) and the matting agent (C).

13. The contacting component according to claim 1, wherein a noise risk value measured by a stick-slip measuring instrument SSP-02 manufactured by Ziegler-Instruments GmbH is 3 or less under the measuring conditions as set forth below:

Measuring conditions:
A large size specimen having a length of 60 mm, a width of 100 mm and a thickness of 4 mm and a small size specimen having a length of 50 mm, a width of 25 mm and a thickness of 4 mm are prepared and a noise risk value is measured when the two specimens of the large size and the small size are rubbed against each other three times under the conditions of a temperature 23° C., a humidity 50% R.H., a load 40N, a speed 10 mm/second and an amplitude of vibration 20 mm.

14. A method for reducing squeaking noises, comprising the step of:
placing two contacting components as defined in claim 1 into contact with each other.

15. The contacting component according to claim 1, wherein the matting agent (C) is selected from the group consisting of calcium carbonate, talc, silicic acid, silicate, asbestos, mica, glass balloon, phenolic resin balloon, glass fiber, carbon fiber, metallic fiber, ceramic whisker, titanium whisker and plastic fine particles.

* * * * *